United States Patent [19]
Ortel

[11] Patent Number: 5,263,021
[45] Date of Patent: Nov. 16, 1993

[54] SYSTEM FOR INTEGRATED DISTRIBUTION OF SWITCHED VOICE AND TELEVISION ON COAXIAL CABLE

[75] Inventor: William C. G. Ortel, New York, N.Y.

[73] Assignee: Nynex Corporation, Del.

[21] Appl. No.: 805,388

[22] Filed: Dec. 10, 1991

[51] Int. Cl.$^5$ .............................................. H04J 1/16
[52] U.S. Cl. ........................................ 370/74; 370/76; 370/79; 370/124; 379/134; 379/242; 455/3.1; 455/234.2; 455/249.1
[58] Field of Search ............... 370/17, 76, 79, 124, 370/74; 379/134, 242; 455/3.1, 3.3, 234.2, 249.1

[56] References Cited

U.S. PATENT DOCUMENTS

| | | | |
|---|---|---|---|
| 4,835,494 | 5/1989 | Preschutti | 379/398 X |
| 4,847,829 | 7/1989 | Tompkins et al. | 370/62 |
| 4,876,741 | 10/1989 | Jacobs et al. | 455/234.2 X |

Primary Examiner—Douglas W. Olms
Assistant Examiner—Russell W. Blum
Attorney, Agent, or Firm—Loren Swingle; John J. Torrente

[57] ABSTRACT

A system for voice distribution amongst a plurality of telephone subscriber locations operating on a broadband cable network wherein RF transmitting and RF receiving channels for carrying voice and signalling information are established at the subscriber locations and coupled with the broad band network and a central switch is also coupled with the broadband network and enables each RF transmitting channel to be selectively coupled to any of the RF receiving channels. The system is further providing with an adjusting means which is responsive to the traffic on the central switch and which enables the power level in each of the channels to be selectively adjusted.

52 Claims, 15 Drawing Sheets

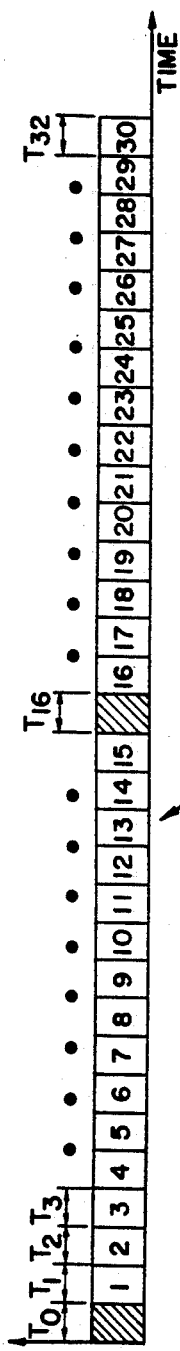
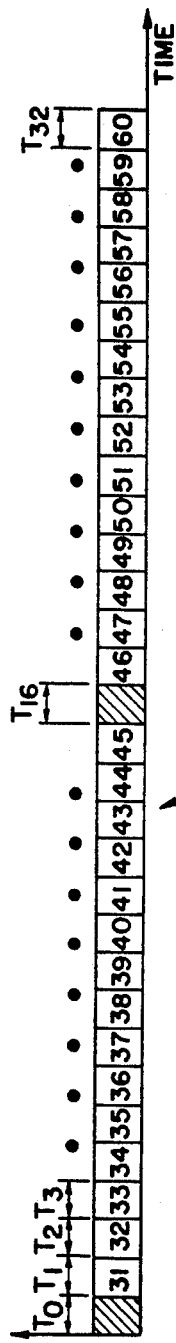
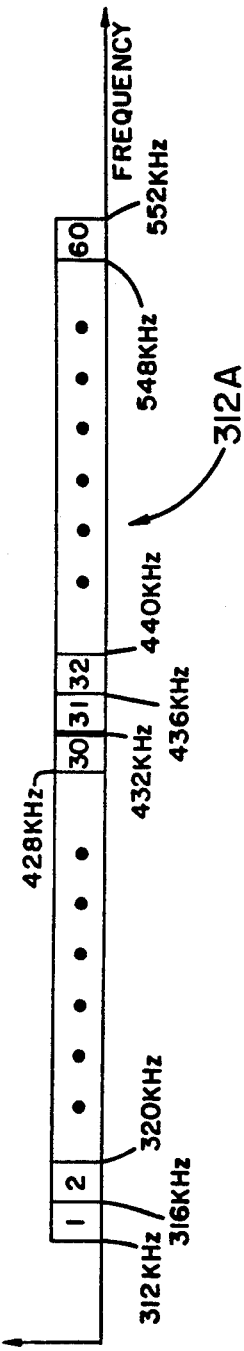
FIG. 2A
FIG. 2B
FIG. 3

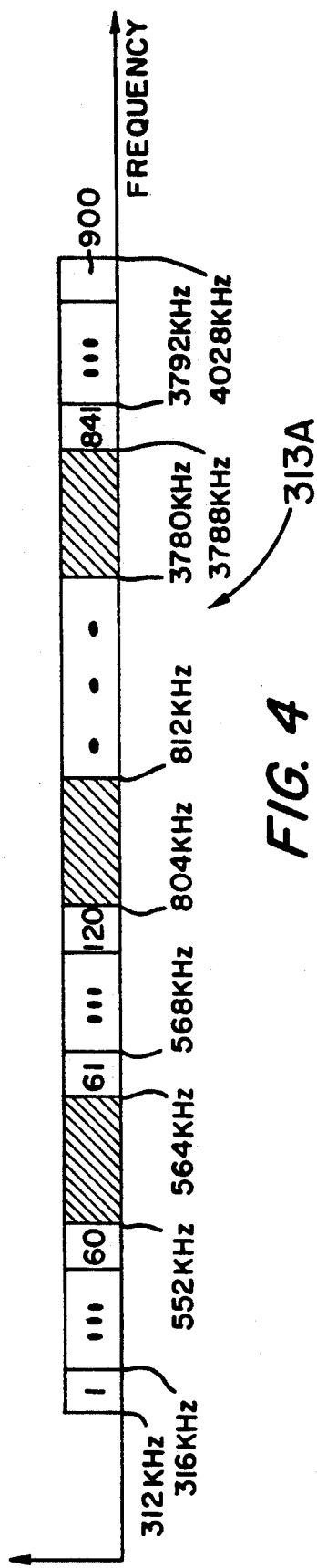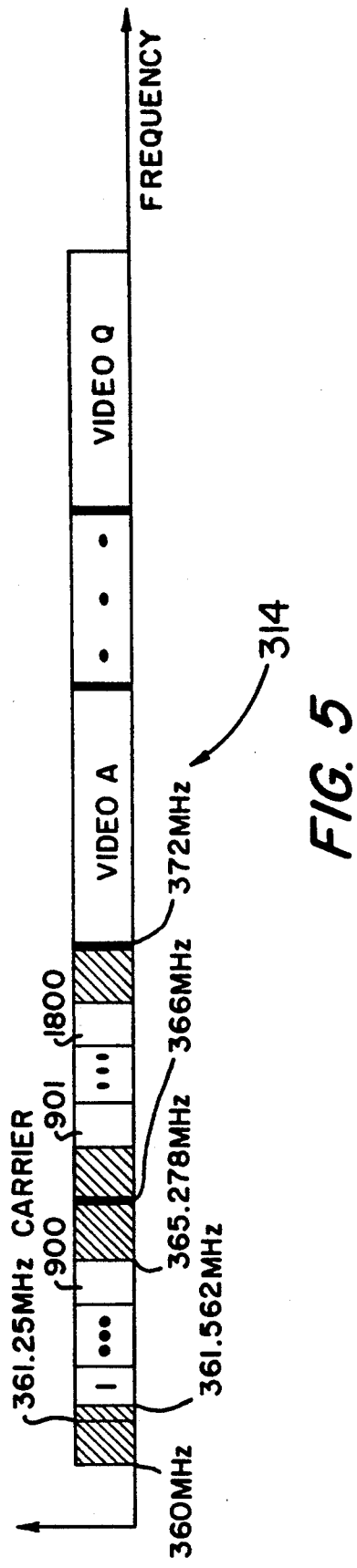
FIG. 4
FIG. 5

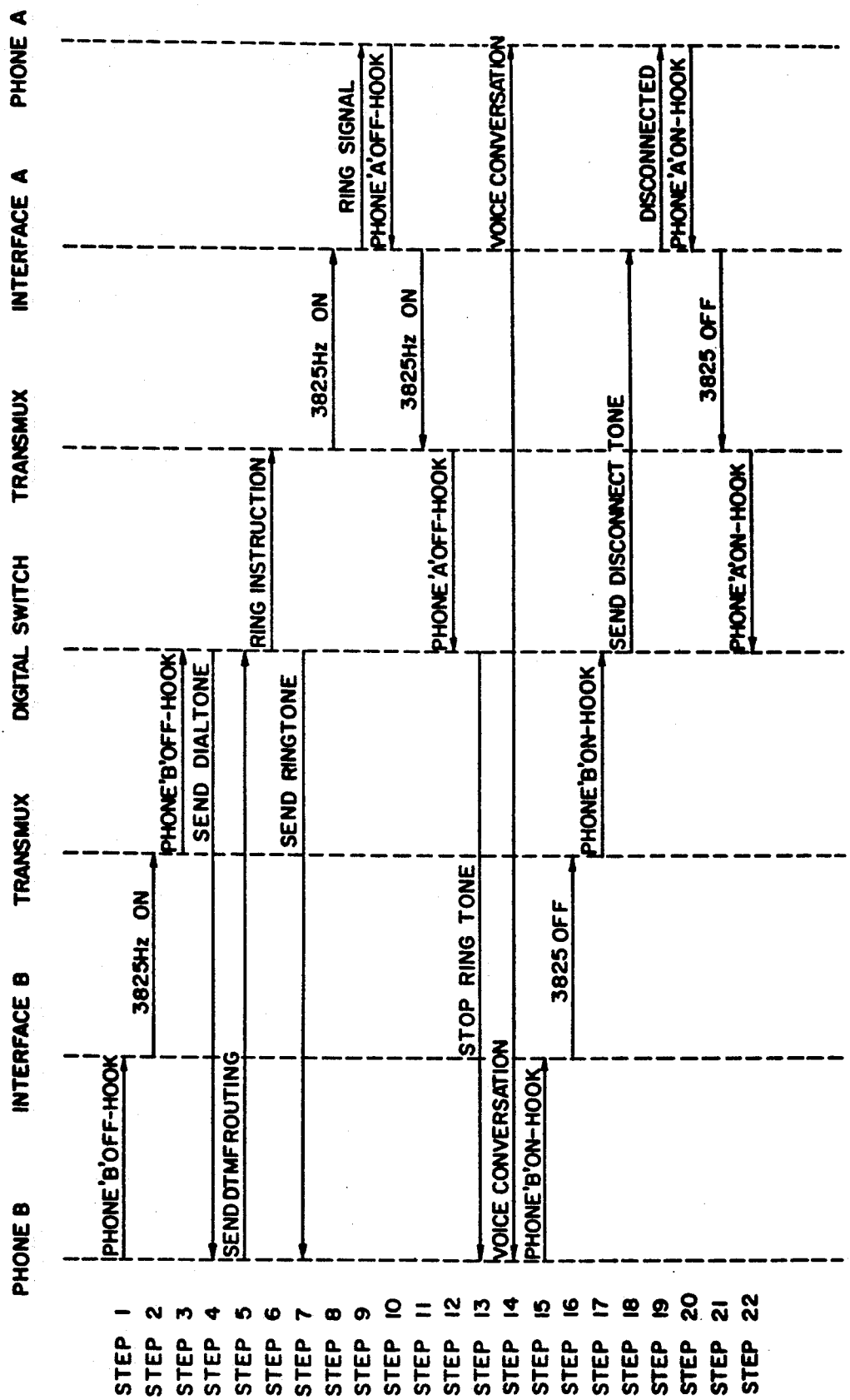

SYSTEM FOR INTEGRATED DISTRIBUTION OF SWITCHED VOICE AND TELEVISION ON COAXIAL CABLE

BACKGROUND OF THE INVENTION

This invention relates to voice distribution and switching and, in particular, to combining voice distribution and switching with video distribution on a broadband coaxial cable network.

In U.S. patent application Ser. No. 635,751, assigned to the same assignee hereof, there is disclosed an improved system for providing voice and video distribution over a cable network. In the system of the '751 application, a plurality of telephone user or subscriber locations are provided and each subscriber location has an associated RF transmitting channel and an associated RF receiving channel. These channels carry voice and signalling information to and from, respectively, the subscriber locations.

A broadband cable network communicates with the subscriber locations and carries or couples with the associated RF transmitting and receiving channels. The cable network also communicates with a centralized switching and control means which is adapted to enable the RF transmitting channels to be selectively coupled or switched to any of the RF receiving channels. As a result, voice communication between the associated subscriber locations of the coupled channels can be carried out.

The particular switching means disclosed in the '751 application comprises a time division multiplex (TDM) switch and a frequency/time conversion means. The latter conversion means establishes transmitting and receiving TDM digital channels corresponding to the transmitting and receiving RF channels so as to permit switching between channels by the TDM switch. Also, in the system of the '751 application, the RF transmitting and receiving channels are analog channels organized into broadband RF channels of the cable network. Each user location, in turn, is assigned and couples with the broadband RF channel or channels containing its associated transmitting and receiving channels.

As can be appreciated, the conventional cable network used in the system of the '751 application includes many active and passive components, such as, for example, amplifiers, diplex filters, directional couplers, splitters and combiners. For such a cable network, standards have been established for its end-to-end characteristics. In particular, I.E.E.E. standard 802.7 requires that the network be designed such that it receives broadband RF signals in a standard RF channel (typically, a 6 Mhz channel) at a level of +54 dBmV and outputs these signals at a level in the range of +5 dBmV to +15 dBmV. This standard further requires that downstream signals (those in a receive channel) exhibit a signal-to-noise ratio of at least 43 dB, while upstream signals (those in a transmit channel) exhibit a signal-to-noise ratio of 41 dB.

When 900 (or 1000) standard voice channels (each, typically 4 Khz wide) are combined in one RF broadband channel (6 Mhz channel) in the '751 application system, the maximum signal power applied to each voice channel will be approximately 30 dB less than the total power which can be applied to the broadband channel. This is based upon an effective noise bandwidth for the 6 Mhz broadband channel of about 4 Mhz, since, as will be discussed, hereinbelow vestigial sidebands occupy part of this channel. Accordingly, the power of the noise in each 4 Khz voice channel will also be approximately 30 dB less than the noise carried in the broadband channel. Since both the signal and noise power each drop by 30 dB in each voice channel, the signal to noise ratio in each channel will remain the same as that for the broadband channel, i.e., 43 dB in the downstream direction and 41 dB in the upstream direction.

The aforesaid signal to noise ratios, however, are less than those typically recommended for conventional telephone communications. According to *Transmission Systems for Communications*, 4th edition, Bell Telephone Labs, 1969, p. 40, a typical telephone system operates with speech at −41.4 dBm, on average, with louder spurts at +10 dBm, or a ratio of 51.4 dB. Furthermore, according to CCITT recommendation G.222 for standard telephone systems, noise in a 4 Khz voice channel should be 2500 pW at a 0dBm point. A standard 4 Khz telephone channel should thus exhibit a signal-to-noise ratio on the order of about 56 dB which, as, above-noted, is higher than that expected for the 4 Khz voice channels in the system of the '751 application.

It is, therefore, an object of the present invention to improve the system of the '751 application.

It is a further object of the present invention to modify the system of the '751 application so as to obtain higher signal-to-noise ratios for the voice channels of the system.

SUMMARY OF THE INVENTION

In accordance with the principles of the present invention, the above and other objectives are realized in the above-described system of the '751 application by providing a further means which is responsive to the centralized switching and control means of the system and which is able to enable selective adjustment of the level of the voice and signalling information in the RF receiving and transmitting channels of the system.

In the embodiment of the system described hereinbelow, the adjusting means is able to adjust the power level of the voice and signalling information in each channel of the system. This adjustment is able to be carried out at the cable network/central switch means end, i.e., the switch end, of the system, and at the subscriber location/cable network end, i.e., the subscriber end of the system.

First and second attenuation means, respectively, are provided for this purpose for each channel and a control means included in the adjusting means develops signals for controlling these attenuators based upon the traffic condition (i.e., active RF voice channels, idle RF voice channels, etc.) of the switch. The signals developed for controlling the second attenuation means of the channels (i.e., those at the switch end of the system) are directly applied to these means. The signals for the first attenuation means (i.e., those at the subscriber end of the system) are incorporated into signalling information sent by the central switch means to the subscriber locations. This signalling information, when received at each respective subscriber location, is sensed by a subscriber location control means which enables control of the first attenuator means at the respective location.

In the disclosed embodiment, the adjusting means determines an adjusted power level signal based on the aforesaid traffic condition of the switch, the available power in each RF broadband channel and the power in the active channels. This adjusted power level signal is then used to set the first and second attentuation means of the idle channels. Channels, once they become active, are not further adjusted during their active state so as to not disturb voice communication in progress.

BRIEF DESCRIPTION OF THE DRAWINGS

The above and other features and aspects of the present invention will become more apparent upon reading the following detailed description in conjunction with the accompanying drawings in which:

FIGS. 2A and 2B each show TDM voice channels used in the system of FIG. 1;

FIG. 3 shows the TDM voice channels of FIGS. 2A and 2B converted into a corresponding group of RF voice channels forming an RF voice channel sub-group;

FIG. 4 shows additional RF voice channel sub-groups multiplexed with the voice channel sub-group of FIG. 3 to form a broadband RF voice channel group;

FIG. 5 shows the broadband RF voice channel group of FIG. 4 modulated onto an RF cable network carrier with other contiguous broadband RF voice channel groups and broadband RF video channels;

FIG. 8 shows a timing chart for operation of the system of FIG. 1;

DETAILED DESCRIPTION

The description to follow and FIGS. 1-10 describe and show a video/voice distribution system as described and shown in the '751 application. The further description and FIGS. 11-15 describe and show a modification of the '751 system in accordance with the principles of the present invention.

Figure 1A:
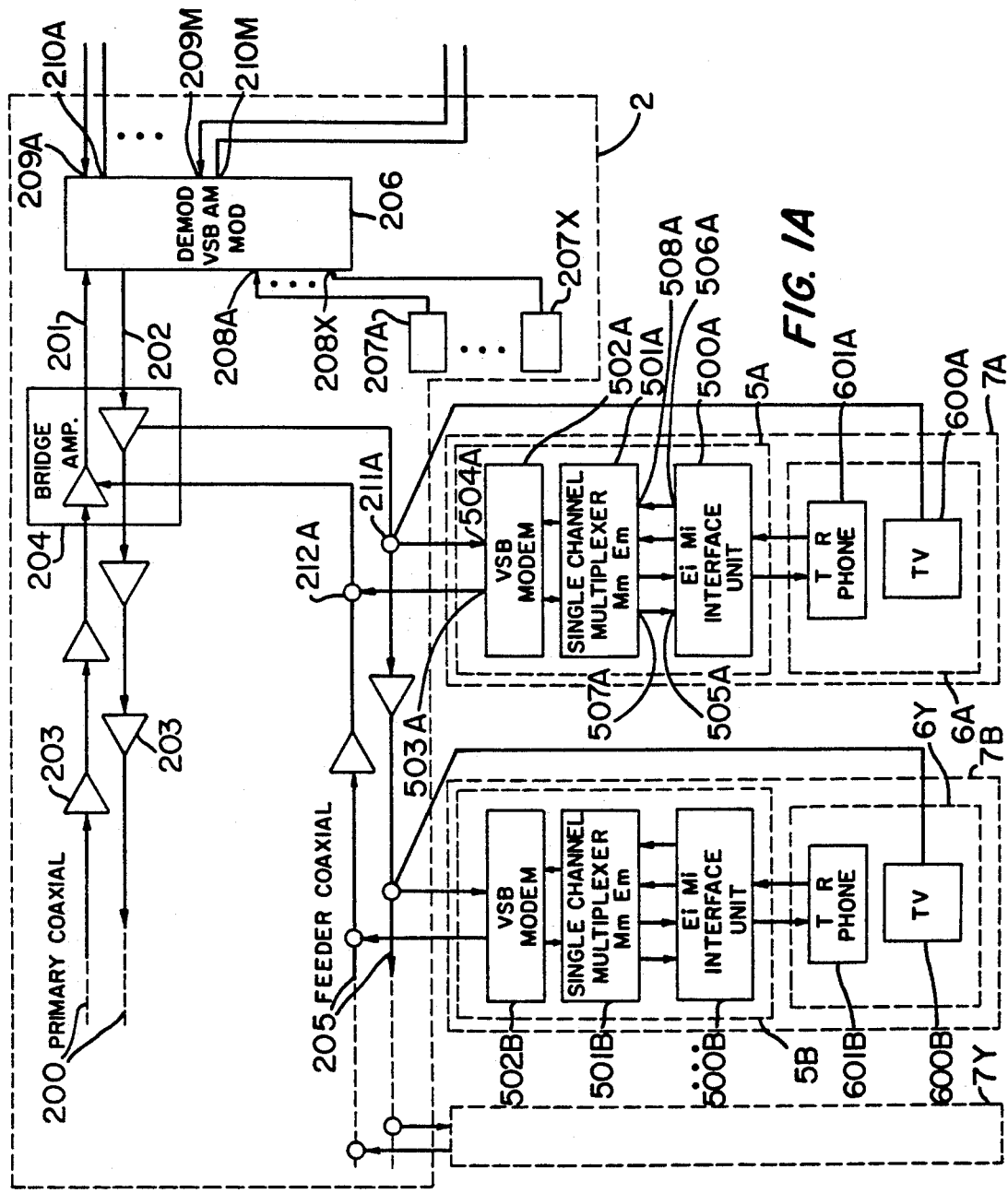
FIGS. 1A and 1B show a video/voice distribution system as disclosed in the '751 application.
Figure 1B:
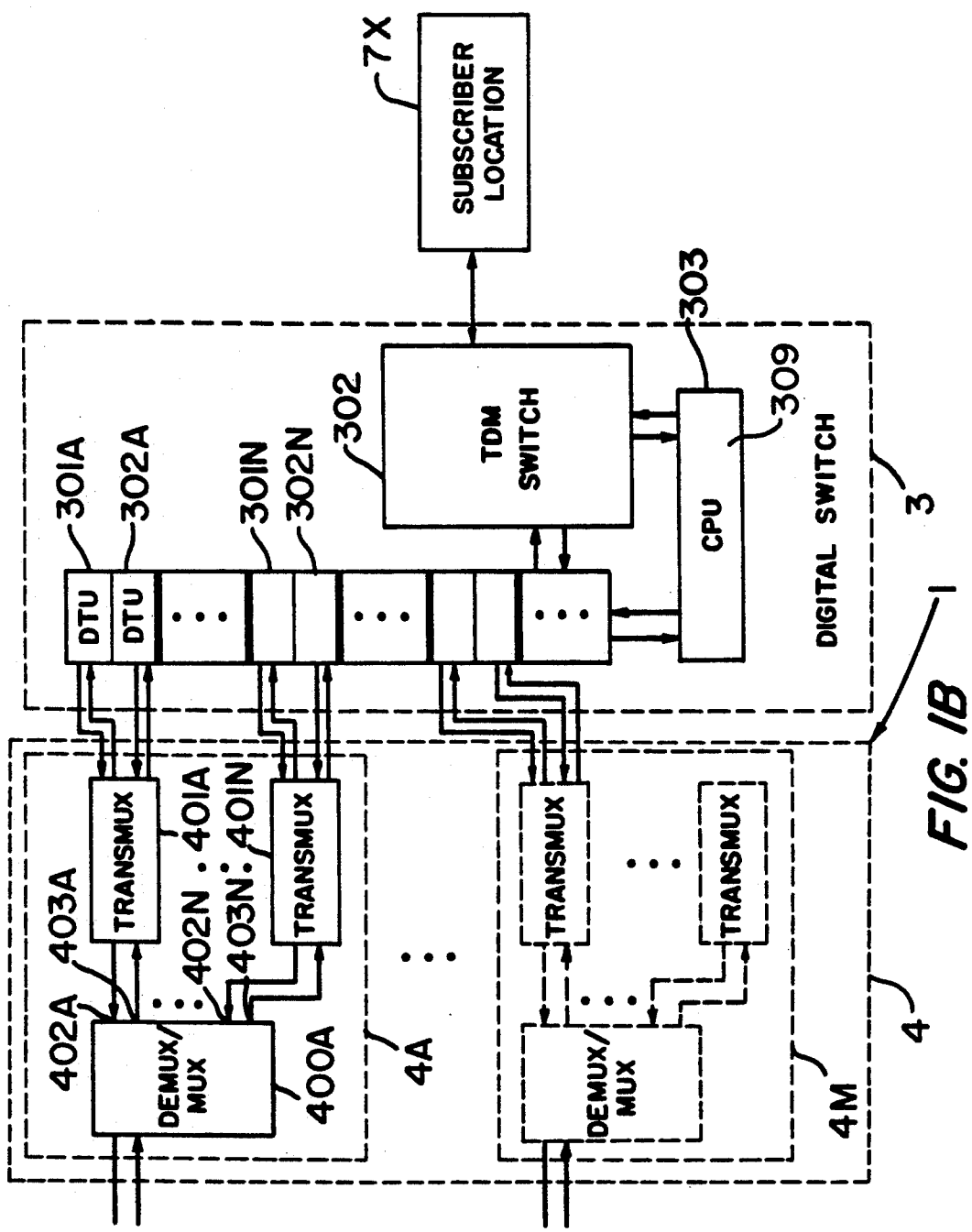

As shown in FIGS. 1A and 1B, the system 1 comprises a broadband coaxial network 2 which carries voice and video RF channels to voice and video equipment at the subscriber locations 7A to 7Y. More particularly, the broadband coaxial network 2 comprises a vestigial sideband ("VSB") demodulator/modulator 206 which transmits RF video channels and transmits and receives RF voice channels over a primary coaxial system 200 having feeder coaxial branches 205. The feeder coaxial branches 205 connect to the primary coaxial branch 200 through bridging amplifiers 204. They also connect to the televisions 600A-600Y at the subscriber locations 7A-7Y via drops 211A-211Y.

As shown, the coaxial branch 200 and each of its feeder branches 205 comprise an incoming or upstream coaxial cable 201 and an outgoing or downstream coaxial cable 202. Line amplifiers 203 are connected to the cables 201 and 202 at preselected intervals, e.g., intervals of approximately one half mile, to compensate for signal attenuation.

In the present case, the broadband coaxial network 2 is of the type typically used to distribute video signals and, thus, has a broad bandwidth reaching as high as about 900 Mhz. Furthermore, to permit concurrent distribution of multiple video signals on the network, the 900 Mhz bandwidth of the network is divided into multiple, contiguous broadband RF channels, each individual broadband RF channel being of sufficient bandwidth to carry an independent video signal. To accommodate standard video signals, each broadband RF channel would thus be approximately 6 MHz wide.

The VSB demodulator/modulator 206 receives input video signals 208A-208X from video or TV sources 207A-207X. Each video source 207A-207X might be an antenna or a satellite. The VSB demodulator/modulator 206 modulates the input video signals onto a network carrier so that the resultant network signal contains contiguous or multiplexed broadband RF channels each carrying one of the video signals. This network signal is placed on the downstream coaxial cable 202 and subsequently received and decoded by the televisions 600A-600Y located at the subscriber locations 7A-7Y.

The system 1 is further adapted to permit the distribution of voice information among the subscriber locations 7A-7Y, as well as the aforementioned video information. This is accomplished in a manner which allows for a relatively large number of selectively connectable voice channels and, therefore, a relatively large number of subscriber locations capable of voice communication with one another.

More particularly, a number of broadband RF (i.e., 6 MHz) channels of the cable network 2 are used to carry voice information and associated signalling and control information among the subscriber locations. This is accomplished by adapting the system 1 for each subscriber location to establish associated RF transmitting and RF receiving voice channels and by allocating these voice channels to one or more of the broadband RF channels being used for voice transmission. It is further accomplished by adapting the system 1 to provide central switching and control of the RF transmitting and receiving voice channels such that each RF transmitting voice channel can be selectively switched or coupled to any one of the RF receiving voice channels. In this way, a voice path can be established between each subscriber location and any of the other subscriber locations in the system.

In the present illustrative embodiment, the RF transmitting and receiving voice channels of each subscriber location are established by a respective drop box (i.e., 5A, 5B . . . , 5Y located at the particular subscriber location. The RF voice channels associated with the different subscriber locations are, furthermore, established by the respective drop boxes so that they form RF voice channel groups, each voice channel group being allocated to a different one of the RF broadband channels assigned to voice transmission and being carried by the network 2 carrier.

In the present case, since the network 2 includes an upstream cable 201 as well as a downstream cable 202, the RF transmitting voice channel and RF receiving voice channel of each subscriber location can occupy the same RF band. Also, because the RF receiving and RF transmitting voice channels of a given subscriber location can occupy the same RF band, they can also be carried in the same RF broadband channel of the cable network.

In the event the cable network 2 were modified to use only a single cable for upstream and downstream transmission, the RF transmitting and RF receiving voice channels would have to be offset from each other to prevent interference. In such situation, the channels would likely be required to occupy separate RF broadband channels of the cable network.

As above-indicated, the RF transmitting voice channel groups established by the subscriber locations are carried in the upstream cable 201 in the multiplexed broadband RF channels of the network 2. Similarly, the RF receiving voice channel groups are carried via the downstream cable 202 again in the multiplexed RF broadband channels of the network.

As also above indicated, the system 1 is adapted to provide centralized, selective switching or coupling of the voice information and associated signalling information in each RF transmitting channel to any one of the RF receiving channels. In the present illustrative example, this is effected by a digital switch 3, which is shown as including a TDM switch 302 and a CPU 309, and by a time/frequency converter assembly 4. The converter assembly 4 includes individual time/frequency converter units 4A to 4M, each assigned to a particular RF broadband channel carrying a frequency division multiplexed (FDM) RF voice channel group.

More particularly, after demodulation of the upstream network signal to produce the individual RF broadband channels, the modulator/demodulator 206 passes the broadband channels to respective output ports 210A to 210M connected to converter units 4A-4M, respectively. Each converter unit then converts the RF transmitting voice channels in its received RF broadband channel into corresponding digital voice channels and one or more control channels organized into one or more TDM signals for processing by the digital switch 3.

As a result of its processing, the digital switch 3 places voice and signalling information into digital voice channels and one or more control channels which correspond to the receiving RF voice channels. The switch 3 organizes these digital voice channels and control channels also into one or more TDM signals and conveys these signals to their associated converters 4A to 4M, i.e., to the respective converters assigned to the RF broadband channel carrying the corresponding RF voice channels. Each converter then converts its received digital channels into a corresponding FDM RF receiving voice channel group. Each receiving voice channel group is then delivered to the modulator/demodulator 206 where it is placed in the corresponding broadband RF channel and modulated onto the network carrier for subsequent delivery to the subscriber locations via the downstream cable 202.

In the present illustrative case of the use of TDM switch 302 in the digital switch 3, the digital voice channels transmitted between the switch and each of the converters 4A to 4M are contained in time slots of the generated TDM signals. Each time division multiplexed signal contains a number of digital voice channels, a synchronization channel and a control channel for control and signalling information.

The TDM signals are communicated to and from the TDM switch 302 by digital trunk units (DTUs) included in the switch 3. A group of these units is associated with each converter unit 4A to 4M (e.g., DTU's 301A to 301N and 302A to 302N are associated with converter 4A). Each converter unit 4A to 4M, in turn, comprises a number of time/frequency converters (e.g., TRANSMUXES 401A to 401N) each of which transmits and receives the TDM signals from a pair of DTUs (e.g., DTUs 301A and 302A are paired with TRANSMUX 401A).

Each of the TRANSMUXES in the units 4A to 4M converts its received digital voice channels and its received synchroniztion and control channels into a corresponding FDM sub-group of RF receiving voice channels. Each FDM channel sub-group is then combined by a demultiplexer/multiplexer (DEMUX/MUX) unit in the respective converter (e.g., DEMUX/MUX 400A in converter 4A) with other channel subgroups to generate an FDM RF channel group which is delivered to a respective receive port 209A to 209M on the modulator/demodulator 206.

In the other direction, the reverse process occurs in each of the converter units 4A to 4M. Thus, the FDM RF transmitting voice channel group received at each converter 4A to 4M is separated by the DEMUX/MUX into FDM sub-groups of RF transmit voice channels. These FDM sub-groups are then fed to respective TRANSMUXES, where they are converted to TDM time signals having corresponding digital transmit voice channels and associated synchronization and control channels. These TDM signals are delivered to corresponding DTUs and processing by the TDM switch 302.

FIGS. 2A and 2B show the format of the TDM signals transmitted between the DTUs 301A and 302A and the TRANSMUX 401A of the converter unit 4A. Each signal is shown as carrying 30 digital voice channels (T1-T15 and T17-T32), one synchronization channel (T0) and one control channel (T16), the two signals together accounting for 60 voice channels.

FIG. 3 illustrates the FDM RF receiving voice channel sub-group signal transmitted between the TRANSMUX 401A and DEMUX/MUX 400A of the unit 4A. This signal results from frequency conversion of the TDM signals of FIGS. 2A and 2B. As shown, each digital voice channel is converted into a 4 KHz wide RF voice channel, resulting in 60 RF voice channels, each containing the voice, control and synchronization information pertaining to its associated digital channels.

FIG. 4 illustrates the resultant FDM RF receiving voice channel group signal delivered by the DEMUX/MUX 400 as a result of the applied FDM RF subgroups from the TRANSMUXES 401A to 401N. The illustration assumes 15 TRANSMUXES in the converter 4A, resulting in (15×60) or 900 RF receive voice channels over a frequency band of 312 KHz to 4028 KHz.

Finally, FIG. 5 shows the downstream network signal from the modulator/demodulator 206. As shown, the FDM RF receiving voice channel group of FIG. 4 has been modulated onto the network carrier (361.25 Mhz) in a first 6 MHz RF broadband channel. Also shown is another FDM RF receiving voice channel group containing RF voice channels 901 to 1800 modulated onto the network carrier in a second 6 MHz channel contiguous with the first channel. As mentioned earlier, the downstream signal also contains video channels, (VIDEO A and VIDEO B), also modulated onto the carrier in further multiplexed 6 MHz broadband channels.

As above-indicated, the RF transmitting and receiving voice channels are coupled to and from their corresponding subscriber locations via respective dropboxes 5A to 5Y. Referring to dropbox 5A for illustrative purposes, the dropbox comprises a VSB modulator/demodulator or modem 502A, a single channel multiplexer 501A, and an interface unit 500A. The VSB modem 502A has a receiving port 504A which connects to the downstream cable 202 at drop 211A and a transmitting port 503A which connects to the upstream cable 201 at drop 212A.

The VSB modem 502A is configured to demodulate or extract from the downstream network signal the broadband RF channel (i.e., 6 MHz channel) containing the RF receiving voice channel associated with the subscriber location 7A. Thus, assuming the subscriber location 7A corresponds to the RF receiving voice channel 1 in the network signal of FIG. 5A, the modem 502A will extract from this signal the first broadband RF channel (i.e, the 360-366 MHz channel), since it contains the RF receiving voice channel 1. Conversely, an RF transmitting voice channel 1 sent by the single channel multiplexer 501A to the VSB modem 502A will be modulated by the VSB modem 502A into the first broadband RF channel and then transmitted from port 503A of the modem to the upstream cable 201.

The first broadband RF voice channel (366-366 MHz) once extracted by the modem 502A, is then conveyed to the single channel multiplexer 501A which is configured to demodulate the RF channel group to obtain the associated RF receiving voice channel (channel 1) and return this channel to base band to recover the resultant 4 KHz baseband receiving channel. This channel is then processed to extract voice information (i.e., band limited to 300-3400 Hz) and also processed to extract any out-of-band signalling information. The voice information is then passed via output port 507A to an input port 505A of an interface unit 500A. The signalling information is, in turn, passed via another output port Mm to a further input port Ei of the interface unit.

In the transmit direction, the single channel multiplexer 501A receives at its input port 508A from the output port 506A of the interface unit 500A, baseband voice information. The multiplexer also receives signalling information at its Em port from the Mi port of the interface unit. This voice and signalling information is, in turn, modulated by the multiplexer into the RF transmitting voice channel (i.e., channel 1) and sent by the multiplexer to the modem 502A where it is placed in the first RF broadband channel of the network 2, as above-described.

The interface unit 500A provides a standard tip T and ring R connection to a phone 601A located at subscriber location 7A. The band-limited receiving voice channel information at the input terminal 505A of the interface unit 500A is provided to these connections so that voice information becomes available at the phone 601A. Further, transmitted voice information received from the phone 601A on the tip T and ring R connections is transferred by the output terminal 506A of the interface unit 500A to the single channel multiplexer for inclusion in the transmitting voice channel being transmitted at the subscriber location.

The interface unit 500A also develops signalling information based upon the signalling information received at its Ei port and the state of the phone 601A. This signalling information is passed from the Mi port of the interface to the Em port of the modem where it is included in the RF transmitting voice channel developed by the modem, as above-described.

It is desirable to avoid frequency shifts in the modulating and demodulating process performed at the drop boxes 5A to 5Y. To achieve synchronization, the system 1 is further adapted to provide a synchronizing pilot signal at the drop boxes. This signal is supplied from the reference source used to generate the RF channel group signals at the DEMUX/MUX 400A.

Figure 6:
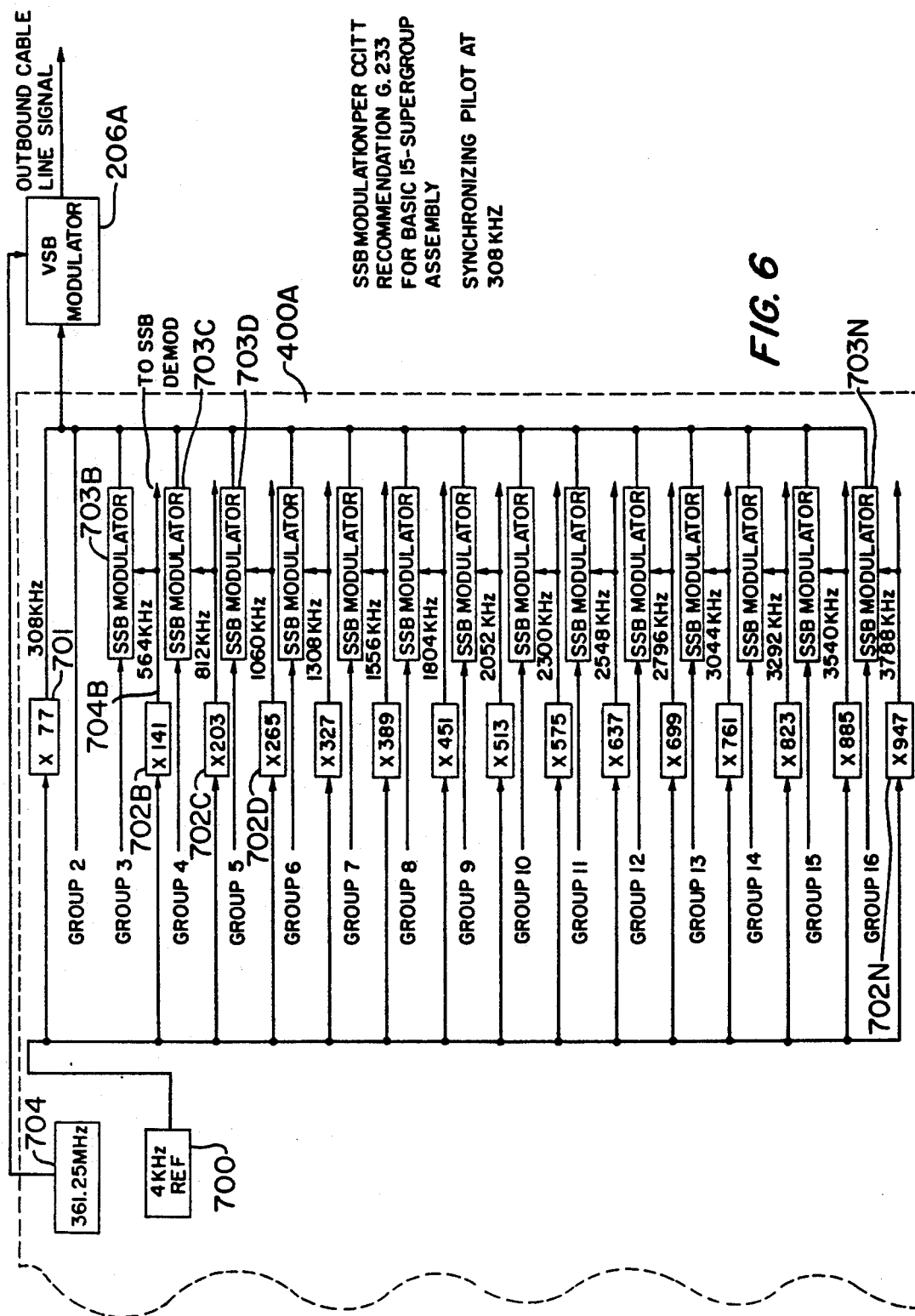
FIG. 6 shows schematically equipment for realizing the broadband RF voice channel group of FIG. 4.

FIG. 6 shows in greater detail the multiplexing section of the DEMUX/MUX 400A used to generate the RF channel group of FIG. 5. A 4 Khz reference frequency source 700 serves as the primary source for generating both pilot signal and reference frequencies for multiplexing the RF channel sub-groups (i.e., groups 2-16). More particularly, the reference frequency is applied to a pilot frequency multiplier 701 which multiplies the frequency by 77 to develop a 308 KHz pilot signal. This signal is modulated onto the network carrier provided by a carrier source 704 to the VSB modulator/demodulator 206. The pilot signal is then recovered at the drop boxes and used to develop reference frequencies for demodulation and modulation as described below.

As is also shown in FIG. 6, the 4 Khz reference frequency is also applied to suitable multipliers 702B-702N whose outputs are applied as reference frequencies to the single sideband modulators 703B-703N. The latter, in turn, modulate the RF frequency sub-groups to develop the RF channel group in FIG. 4. This channel group is also applied to modulator/demodulator 206 to generate the first broadband RF channel of the signal in FIG. 5.

Figure 7:
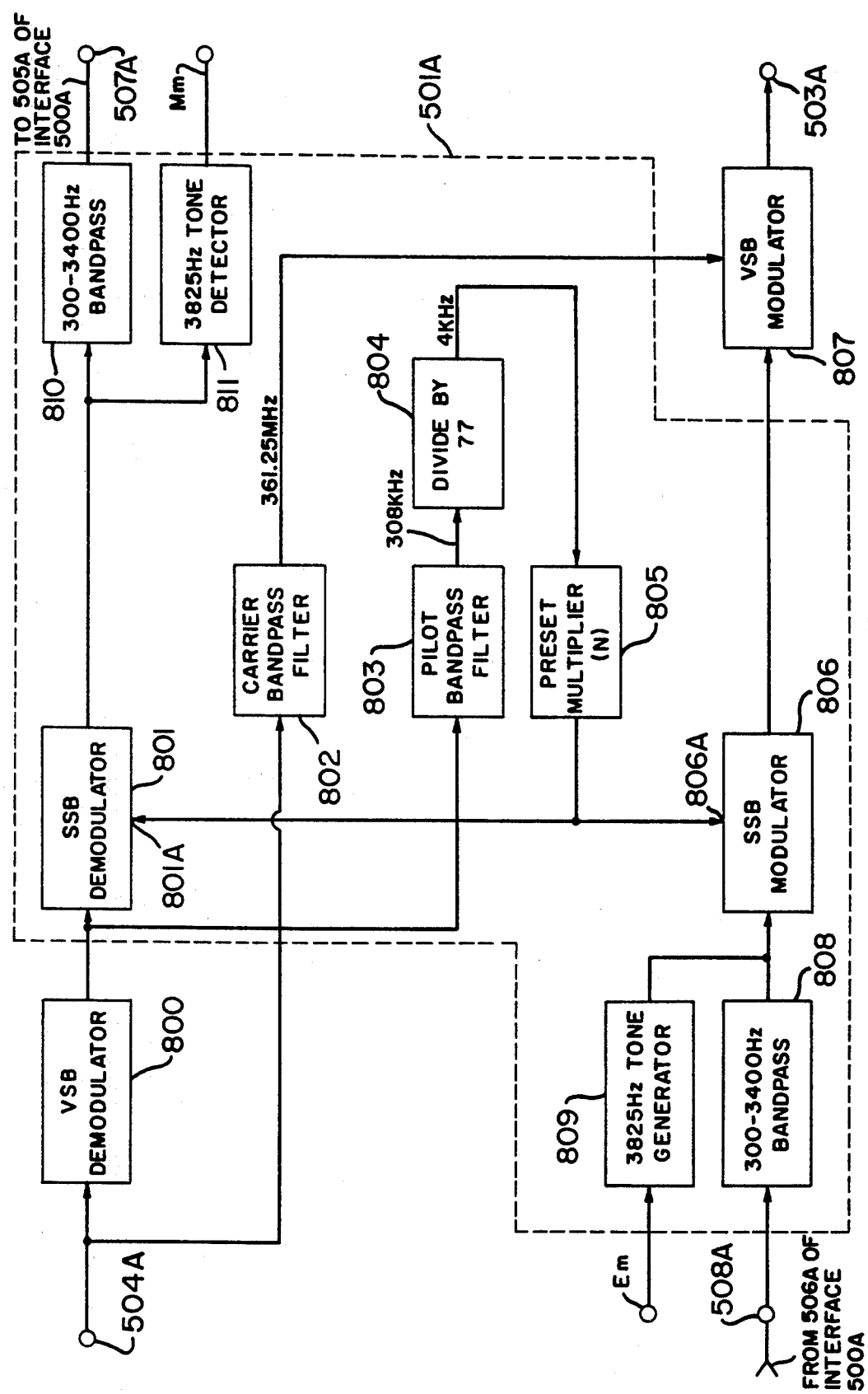
FIG. 7 shows the details of the modulation/demodulation apparatus used at the subscriber locations of the system of FIG. 1.

FIG. 7 shows in greater detail the VSB modem 502A and the single channel multiplexer 501A shown in FIG. 1 modified to utilize the pilot signal generated at the DEMUX/MUX for synchronization. The network signal received at the VSB modem input port 504A is supplied to a carrier bandpass filter 802 and, after passage to VSB demodulator 800, to a pilot bandpass filter 803. The network carrier bandpass filter 802 recovers the 361.25 Mhz network carrier, while the pilot bandpass filter 803 recovers the 308 Khz pilot signal. The recovered signals are then used in the modulator and demodulator processing to ensure synchronization.

More particularly, the recovered network carrier is applied to the VSB modulator 807 of the VSB MODEM 502, thereby ensuring that modulation occurs at the appropriate frequency. The 308 KHz pilot signal, in turn, is applied to a divide by 77 frequency divider 804 to recover the 4 Khz reference signal. This signal is then applied to a preset multiplier 805 to derive the reference frequency for the associated RF transmit and receive voice channels of the subscriber location (i.e., the frequency 312 Khz for the channel 1 of the location 7A). This reference frequency is then applied to the SSB Modulator 806 and the SSB Demodulator 801A of the multiplexer to provide the RF transmit voice channel and recover the baseband voice channel, respectively.

The multiplexer 501A of FIG. 7 also contains bandpass filters 808 and 810 which are used to band-limit the recovered baseband voice channel and the voice channel being transmitted, respectively. Also, the multiplexer is provided with an out-of-band tone generator 809 and an out-of-band tone detector 811. These components generate and detect a 3825 Hz tone which is used as signalling information in the RF transmit and receive voice channels of the subscriber locations.

More particularly, 3825 Hz signalling tones are used to provide an indication of on and off hook conditions and to generate ringing signals. In the present case, each interface unit provides simple logic changes to indicate the on and off hook conditions of its respective phone. These conditions are used to instruct tone generation by the respective multiplexer. Also, the switch 3 uses 3825 Hz tones to request connection to a subscriber location. These interactions will become apparent in the description of the operation of the system 1 set forth hereinbelow.

In the system of FIG. 1, the modems 502A–502Y used at the drop boxes 5A–5Y develop the RF transmitting channels as vestigial sideband signals. The resultant upstream signal on the line 201 thus comprises a number of vestigial sideband signals each carrying a part of the network carrier. These signals are received at the VSB modulator/demodulator 206 which, in accordance with conventional vestigial sideband principles, demodulates the signals by regenerating the network carrier from the received signals and using the regenerated carrier to demodulate the signals. This extracts the RF broadband channels containing the RF transmitting voice channel groups. Each broadband channel is then applied to the appropriate DEMUX/MUX.

Because the vestigial sideband signals in the upstream signal originate at different subscriber locations they will likely arrive at the modulator/demodulator 206 with different phases which may vary over time. As a result, the phase of the network carrier recovered by the VSB modulator/demodulator 206 from these signals may also vary with time.

If this varying phase of the recovered network carrier is found to be undesirable, the modulator/demodulator 206 can be suitably modified to utilize a network carrier for demodulation whose phase does not vary.

Figure 7A:
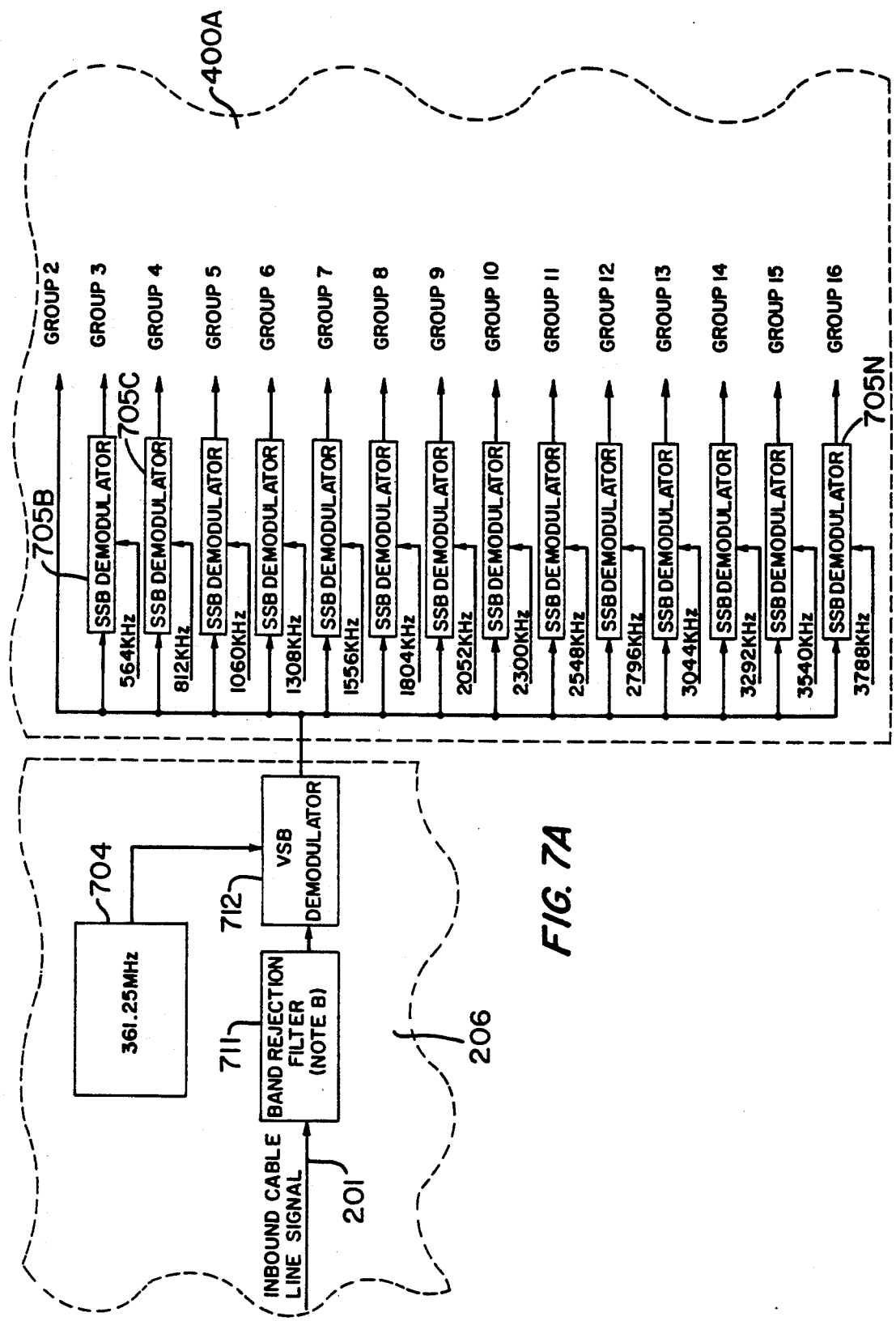
FIG. 7A shows the demodulation portion of the VSB modulator/demodulator of the cable network modified to ensure use of a network carrier having a stable phase.

FIG. 7A shows the demodulation portion of the modulator/demodulator 206 modified to realize this. As can be seen, the upstream signal into the demodulator is first passed through a band rejection filter 711 which is adapted to reject signals at the network carrier frequency (i.e., 361.25 MHz in the present example). The filtered signal is then passed into a VSB demodulator 712 which is now supplied with the network carrier from the carrier source 704 used to supply the VSB modulator 206A (see, FIG. 6). The demodulated signal is then applied to the demultiplexer section of the appropriate DEMUX/MUX to recover the RF channel sub-groups.

In FIG. 7A, the portion of the DEMUX/MUX 400A for recovering the channel sub-groups 2–16 shown in FIG. 6 is also illustrated. As shown, SSB demodulators 705B–705N supplied with appropriate demodulation frequencies recover the respective channel groups 2–16.

FIG. 8 shows the sequence of events when placing a call from the phone 601B at the location 7B to the phone 601A at the location 7A. In the description, it will be assumed that the location 7A uses transmitting and receiving RF voice channel 1 and that the location 7B uses the transmitting and receiving RF voice channel 2, shown in FIGS. 3–5.

Step 1: —PHONE 601B OFF-HOOK—; When phone 601B goes off-hook, the interface 500B detects a change in the state of the associated tip T and ring R lines.

Step 2: —3825 Hz ON—; The interface 500B transfers a logic signal from its Mi port to the Em port of the single channel multiplexer 501B instructing it to turn on the 3825 Hz tone generator. This causes a 3825 Hz tone to be continuously transmitted in the associated RF transmitting voice channel 2 of the network signal of the modem 502B.

Step 3: —PHONE 601B OFF-HOOK—; The RF transmitting voice channel 2 containing the 3825 Hz tone is passed by the modulator/demodulator 206 and DEMUX/MUX 400A to the TRANSMUX 401A assigned to transmitting channel 2. The TRANSMUX detects the presence of the 3825 Hz tone and transmits an off hook signal to the TDM switch 302 via DTU 301A. This signal is carried in the control channel of the TDM signal carrying the transmit voice channel 2 and indicates to the switch that the channel 2 is off-hook.

Step 4: —SEND DIALTONE to PHONE 601B—; The TDM switch 302 places a dial tone signal in the control channel of the TDM signal carrying the receiving voice channel 2 and it is delivered by the DTU 301A to the TRANSMUX 401A. The latter places a dial tone in the RF receiving voice channel 2 which passes via the downstream network signal to the corresponding drop box 5B. This tone is extracted by bandpass filter 810 in the multiplexer 501B and passed through the interface circuit 500B to the T and R lines of phone 601B.

In the remaining discussion of the operating steps of the system 1, it will be understood that transmission between the drop boxes 5A and 5B and the TDM switch 3 occurs over the associated drop box components, the associated cables, the modulator/demodulator 206, and the associated DEMUX/MUX, TRANSMUX and DTU, although these components may not be specifically mentioned in the interests of brevity.

Step 5: —SEND DTMF PHONE NUMBER—; Upon receiving dial tone, the DTMF phone number of phone 601A is transmitted from phone 601B to the TDM switch 302 over the RF and corresponding digital voice channel 2. The digital switch looks up in memory the DTMF phone number dialed and determines that the phone being called is on voice channel 1, i.e., is the phone 601A.

Step 6: —RING INSTRUCTION—; The TDM switch 302 sends a message in the control channel of the TDM signal containing the voice channel 1 instructing the TRANSMUX 401A to turn on a 3825 Hz tone in RF receive voice channel 1.

Step 7: —SEND RING TONE TO ORIGINATOR—; The TDM switch 302 then sends a ringing tone to phone 601B via voice channel 2.

Step 8: —3825 Hz ON—. The TRANSMUX 401A turns on the 3825 Hz signal for the receiving voice channel 1.

Step 9: —RING SIGNAL—. The single channel multiplexer 501A associated with receiving voice channel 1 and phone 601 detects the presence of the 3825 Hz signal and passes a logic signal from its Mm port to the Ei port of interface 500A. The interface 500A then generates a ring signal on the tip T and ring R lines of phone 501A.

Step 10: —PHONE A OFF-HOOK—; When phone 501A is answered there is a detectable change in the state of the associated tip T and ring R lines.

Step 11: —3825 Hz ON—; The interface 500A detects the change in state via a signal to its Em port from the Mi port of the interface. It then instructs the single channel multiplexer 501A to turn on its tone generator to initiate a continuous 3825 Hz tone in transmitting RF voice channel 1 and ceases generating the ringing signal on the tip R and ring R lines of phone 601A.

Step 12 —PHONE A OFF-HOOK—; The TRANSMUX associated with transmitting RF voice channel 1 detects the presence of the 3825 Hz tone in the RF voice channel 1 and transmits an off-hook signal to the TDM switch 302 via the control channel of the TDM signal containing the transmitting voice channel 1.

Step 13 —STOP RING TONE—; The TDM switch stops the ringing tone being sent over the RF receiving voice channel 2.

Step 14: —VOICE CONVERSATION—; The TDM switch at this time has now established a virtual talk path between the calling phone 601B and the called phone 601A over the RF transmit and receive voice channels 2 and the RF transmit and receive voice channels 1. Bidirectional conversation can now occur.

Step 15: —PHONE 601B ON-HOOK—; When phone 601B goes on-hook (i.e., hangs up), the interface 500B detects a change in the state of the associated tip T and ring R line.

Step 16: —3825 Hz OFF—; The interface 500B via its Mi port instructs the single channel multiplexer 501B via its Em port to turn off the 3825 Hz tone generator.

Step 17: —PHONE 601B ON-HOOK—; The TRANSMUX 901A assigned to RF voice channel 2 detects the absence of the 3825 Hz tone and transmits an on hook signal to the TDM switch 302 in the control channel of the TDM signal containing the transmit voice channel 2.

Step 18: —SEND DISCONNECT TONE—; The TDM switch 302 then terminates the virtual path established between voice channel 2 and the voice channel 1, i.e., phones 601B and 601A. The TDM switch then transmits a message over the TDM signal containing the receiving voice channel 1 to the TRANSMUX instructing the TRANSMUX to turn off the 3825 tone in the voice channel 1.

Step 19: —DISCONNECTED—; The interface 500A detects the absence of a 3825 Hz tone in receiving voice channel 1 and sends dial tone to phone 601A.

Step 20:—PHONE ON-HOOK—When phone 601A is placed on-hook there is a detectable change on its associated tip T and ring R lines.

Step 21:—3825 Hz OFF—; The interface 500A detects the change in state and instructs via its Mi port the single channel multiplexer 501A at its Em port to cease transmitting the 3825 Hz tone in RF voice channel 1.

Step 22—PHONE 601A ON-HOOK—; The TRANSMUX associated with RF voice channel 1 detects the absence of the 3825 Hz tone in voice channel 1 and transmits an on-hook signal to the TDM switch 302.

The above described process is repeated for subsequent phone conversations.

Figure 9:
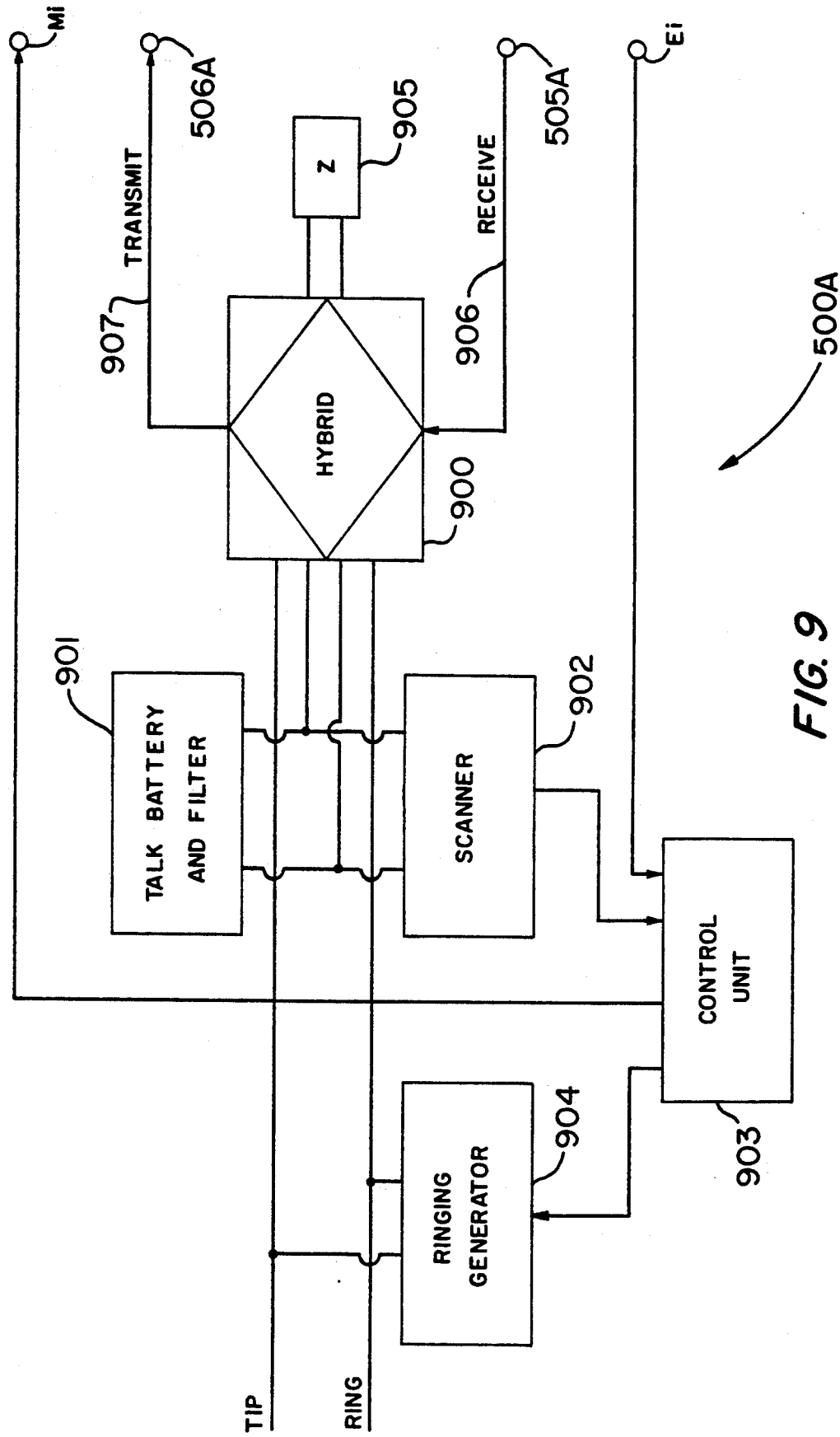
FIG. 9 shows the details of the interface unit used at the subscriber locations of the system of FIG. 1.

FIG. 9 shows in greater detail an example of the interface unit 500A. Similar units can be used for the other interface units 500B–500Y. As shown, a hybrid circuit 900, having a balancing impedance Z, depicted at 905, connects to the TIP and RING lines. A receive line 906 and a transmit line 907 from the input terminal 505A and the output terminal 506A, respectively, connect to the hybrid circuit 900. A scanner 902 is also connected to the hybrid 900 and detects whether the tip T and ring R lines indicate an on-hook or off-hook condition. A ringing generator 904 connects to the TIP and RING lines and generates a ringing signal when directed to do so by control unit 903.

A control unit 903 receives signals from the scanner 902 and the Ei input terminal. Further the control unit supplies control signals to the ringing generator 904 and the Mi output terminal. The various states of ports Ei, Mi the scanner 902 and the ring generator 904 as controlled by the control unit 903 are given below. These states follow from the above discussion of the operation of the system 1. States 1–3 relate to a calling phone and states 4–6 relate to a called phone. An off-hook status indicates an active state and an on-hook status an inactive state.

| State 1: When a phone is idle | |
|---|---|
| Scanner = | on hook |
| Ei = | on hook |
| Mi = | on hook |
| Ring Gen. = | no ring |
| Switch 302 = | not connected |
| State 2: Initiating a call | |
| Scanner = | off hook |
| Ei = | on hook |
| Mi = | off hook |
| Ring Gen. = | no ring |
| Switch 302 = | dial tone, busy tone, ringing tone |
| State 3: Connection with destination | |
| Scanner = | off hook |
| Ei = | off hook |
| Mi = | off hook |
| Ring Gen. = | no ring |
| Switch 302 = | connected |
| State 4: incoming call | |
| Scanner = | on hook |
| Ei = | off hook |
| Mi = | on hook |
| Ring Gen. = | ring |
| Switch 302 = | not connected |
| State 5: phone answered | |
| Scanner = | off hook |
| Ei = | off hook |
| Mi = | off hook |
| Ring Gen. = | no ring |
| Switch 302 = | connected |
| State 6: Calling phone disconnects | |
| Scanner = | off hook |
| Ei = | on hook |
| Mi = | off hook |
| Ring Gen. = | no ring |
| Switch 302 = | not connected |

Figure 10:
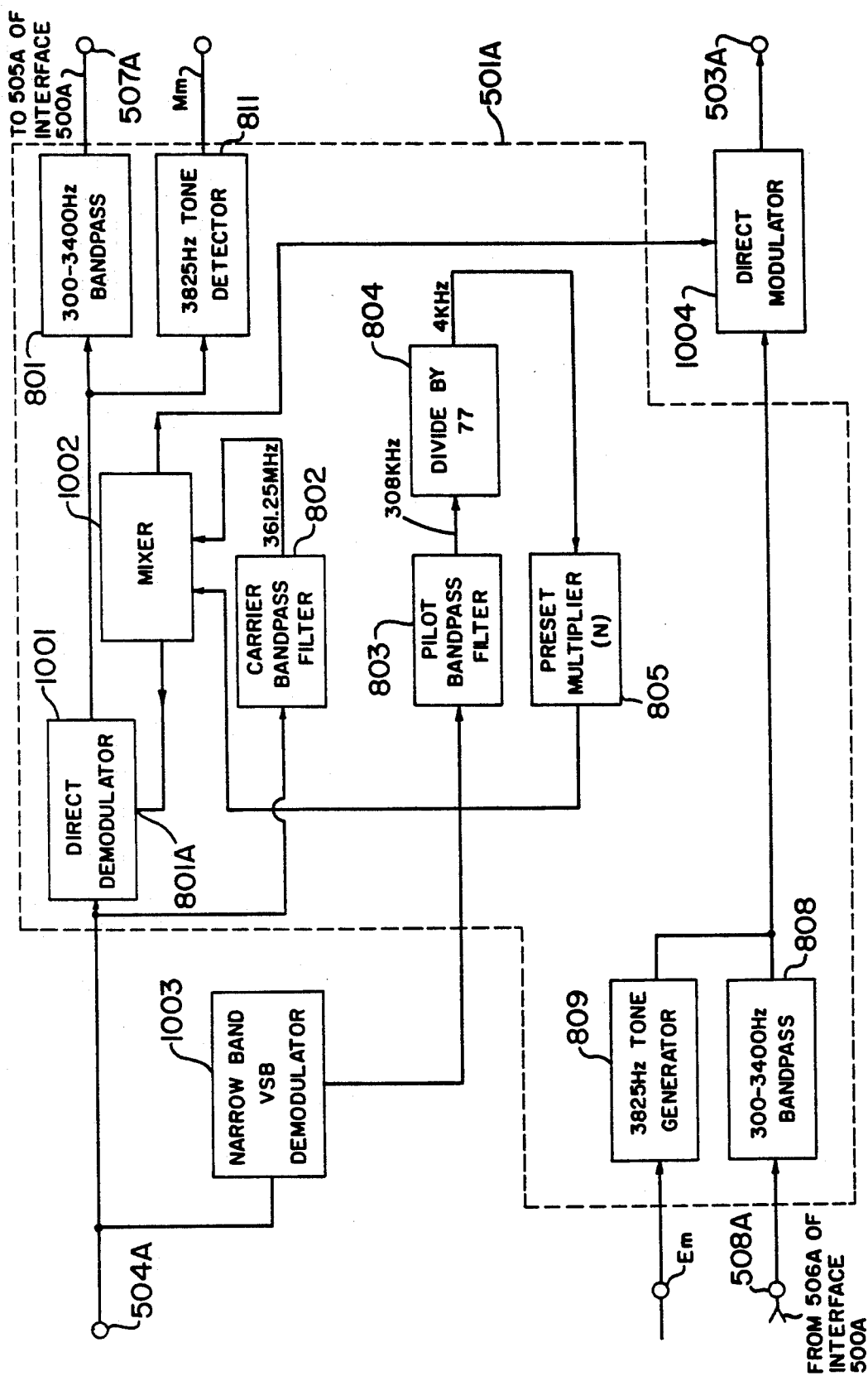
FIG. 10 illustrates a modification of the modulation/demodulation apparatus of FIG. 7.

FIG. 10 illustrates a modification of the VSB modem and single channel multiplexer shown in FIG. 7. In the case of FIG. 10, the RF transmitting and receiving channels are developed by direct modulation and demodulation, respectively. This is realized, in the case of the RF transmitting channel, by modulating the voice and signalling information directly at the frequency desired for the transmitting channel in the associated RF broadband channel. In the case of the RF receiving channel, it is realized by demodulating the received signal directly at the frequency of the RF receiving channel in its associated RF broadband channel. Furthermore, the pilot signal is recovered from the received signal in the FIG. 10 arrangement by using a VSB demodulator whose frequency band of operation need only be sufficiently wide to reach the pilot frequency as modulated onto the network carrier.

In FIG. 10, those components which are the same as those in FIG. 7 have been numbered the same. As shown, the downstream signal received at port 504A is applied to direct demodulator 1001 which directly recovers the RF receiving channel by demodulation at the specific carrier frequency of the channel in the downstream signal. For example, in the case of the RF receiving channel 1 in FIG. 5, the demodulation frequency applied to demodulator 1001 to recover the channel would be at 361.562 MHz. The latter frequency is generated by a mixer 1002 which multiplies the recovered network carrier signal (361.25 MHz) by the output signal (for channel 1 this output is at 312 KHz) of the present multiplier 805.

As in FIG. 7, the preset multiplier 805 develops its output signal by multiplying the 4 KHz reference signal by the factor N. The 4 KHz reference is obtained at the output of the divide by 77 circuit 804 which divides the 308 KHz synchronization pilot signal developed at the output of pilot bandpass filter 803.

The 308 KHz synchronization signal is generated, in this case, from the downstream signal by first passing it through a narrow bandpass VSB demodulator 1003. The pass band of this demodulator need only be sufficient to extend to the 308 KHz synchronization signal as modulated on the network carrier (i.e., extend to 361.588 MHz). The output of the demodulator is then fed to bandpass filter 803 to recover the actual 308 KHz signal.

The output of mixer 1002 is also applied to direct modulator 1004. This results in the input voice and signalling signals to the modulator being directly modulated at frequency (in the case of channel 1 at 361.562 MHz) which places the RF transmitting channel at the desired frequency position in the upstream signal.

It should noted that the TDM switch 302, the TDUs, TRANSMUXES and the DEMUX/MUX of the digital switch 3 and converter 4 can be provided by suitably modified conventionally available components operating on a usual CCITT standard used for TDM transmission. A particular example of a TDM switch 3 might be a Harris #20-20 digital switch equipped with a Harris # 2MB DTU operating at CCITT recommendation G.700. An example of a suitable TRANSMUX might be the DSC-Granger TM 7800-M1 TRANSMUX. A suitable DEMUX/MUX would be one operating in accordance with CCITT recommendation G.233.

As can be appreciated, with the system 1, it is now possible to provide voice communication, via the cable network 2 and the centralized switch 3, between a large number of subscriber locations. For the present illustrative case, 900 voice channels corresponding to 900 subscriber locations have been provided in each 6 MHz RF broadband channel of the cable network, as compared to only 28 channels and locations for the prior art systems. Moreover, the 900 channels in each 6 MHz broadband channel can be connected to each other and any of the channels in the other 6 MHz channels. Accordingly, by suitable selection of the number of broadband channels of the network 2 allocated to voice transmission, 10,000 or more selectively interconnectable voice channels can be provided.

It should be noted that the TDM switch 302 can itself be a switch in a conventional telephone system which is adapted to couple with the cable network as above-described. In such case, subscriber locations (e.g., location 7X) connected to the switch, but not served by the cable network, can also be connected through the switch and the cable network to the subscriber locations served by the network. Additionally, subscriber locations connected through other switches and trunks to the TDM switch can be similarly connected to the subscriber locations on the cable network.

It should also be noted that the system 1 can be further modified so that dial tone need not be established at a subscriber location by the respective interface 500A detecting the absence of the 3825 Hz tone (step 19 of FIG. 8). Instead, when the TDM switch 302 terminates a virtual voice path between subscriber locations (step 18 in FIG. 8), it can itself directly send dial tone to the subscriber location which is still off-hook, allowing the off-hook subscriber to establish another call or go on-hook, as desired.

As can be appreciated from the above, the system I of FIGS. 1–10 permits acceptable voice communication over the cable network 2. However, as also discussed above, the system 1 may not be able to achieve signal-to-noise ratios for the RF transmit and receive voice channels which approach those of standard telephone systems.

FIGS. 11-15 and the discussion that follows show and describe a modified form of the system of FIGS. 1-10 designed to provide increased signal to noise ratios for the RF voice channels of the system. In accordance with the principles of the present invention, this is accomplished by adding to the system 1 an adjusting means which is responsive to the traffic condition of the RF transmit and receive channels of the TDM switch 302 and which adjusts the level and, in particular, the power level, of the voice and signalling information in selective RF transmit and receive channels of the system.

In accordance with this modified form of the invention, it is assumed that the tone signalling for indicating the on-hook and off-hook conditions of each subscriber location is the inverse of that described for the system of FIGS. 1-10. In particular, an on-hook condition is established by continuously transmitting a 3825 Hz tone in the transmit channel of a subscriber location and the off-hook condition is established by the absence of such tone in the transmit channel. The modifications to the system 1 required to achieve this inverse tone operation are straightforward and evident to the skilled artisan and, hence have not been further discussed in detail herein.

Figure 11:
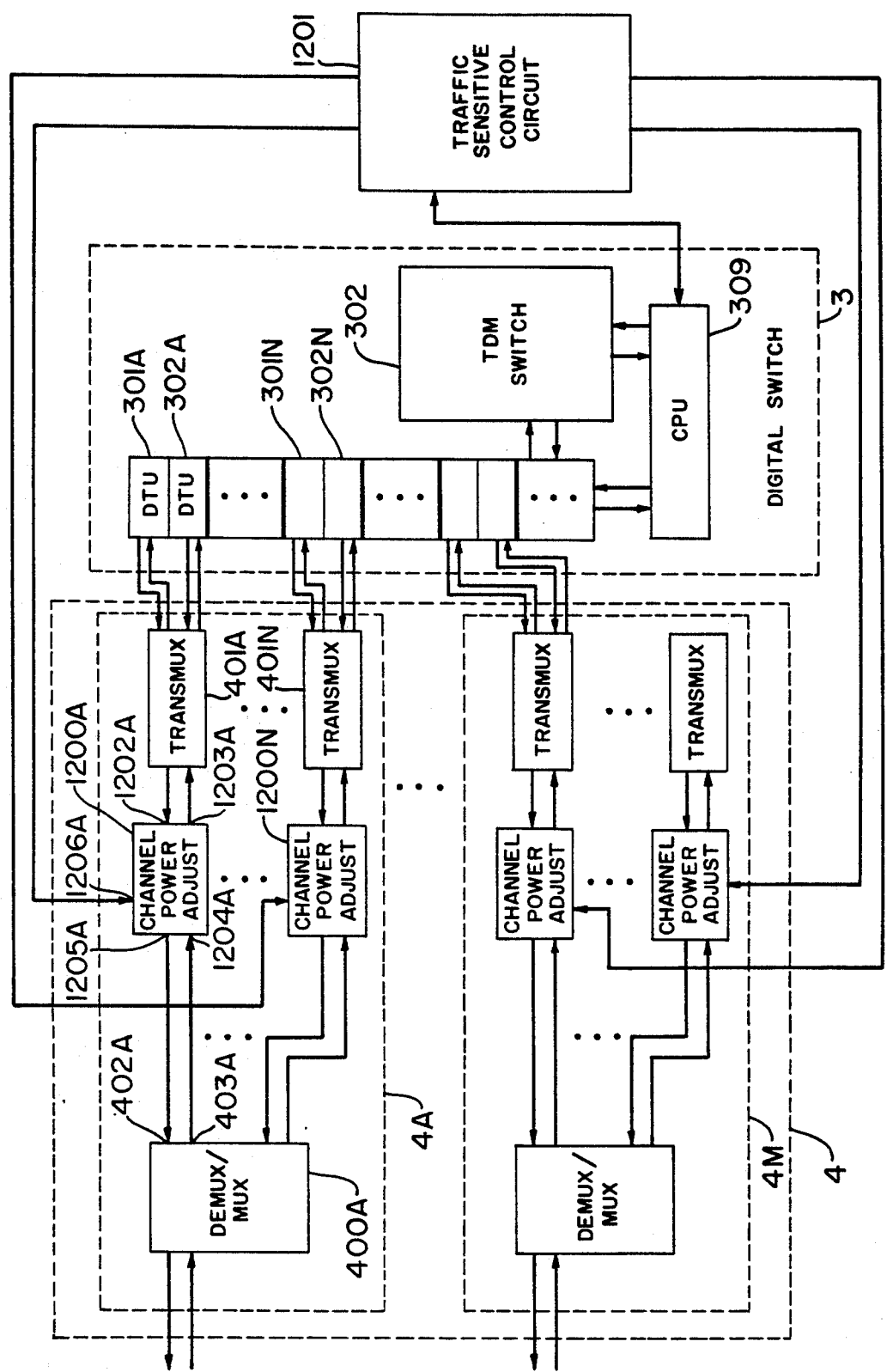
FIG. 11 shows the cable switch end of the system of FIGS. 1A and 1B modified to provide signal level adjustment in accordance with the principles of the present invention.

Turning to the modified system as shown in FIG. 11, a traffic sensitive control circuit (TSCC) 1201 is provided at the switch end of the system 1. The TSCC 1201 communicates with the CPU 309 of the TDM switch 30 and periodically receives information relating to the current traffic and, in particular, the current traffic of the RF transmit and receive voice channels on the switch. Based upon the current traffic of these RF voice channels and other relevant information to be discussed hereinbelow, the TSCC 1201 develops signals for enabling control of the power levels in selective RF transmit and receive channels of the system.

To this end, the TSCC 1201 communicates with channel power adjust circuits, shown as circuits 1200A-1200N for the time/frequency converter assembly 4A, which are provided to control the power level in respective transmit and receive RF voice channels at the switch end of the system. Further, the TSCC 1201 communicates, via signalling through the CPU 309 and the TDM switch 302, with further power adjust circuits (see, transmit and receive attenuators in FIG. 12) for controlling the power levels of the RF transmit and receive voice channels at the subscriber end of the system.

Figure 12:
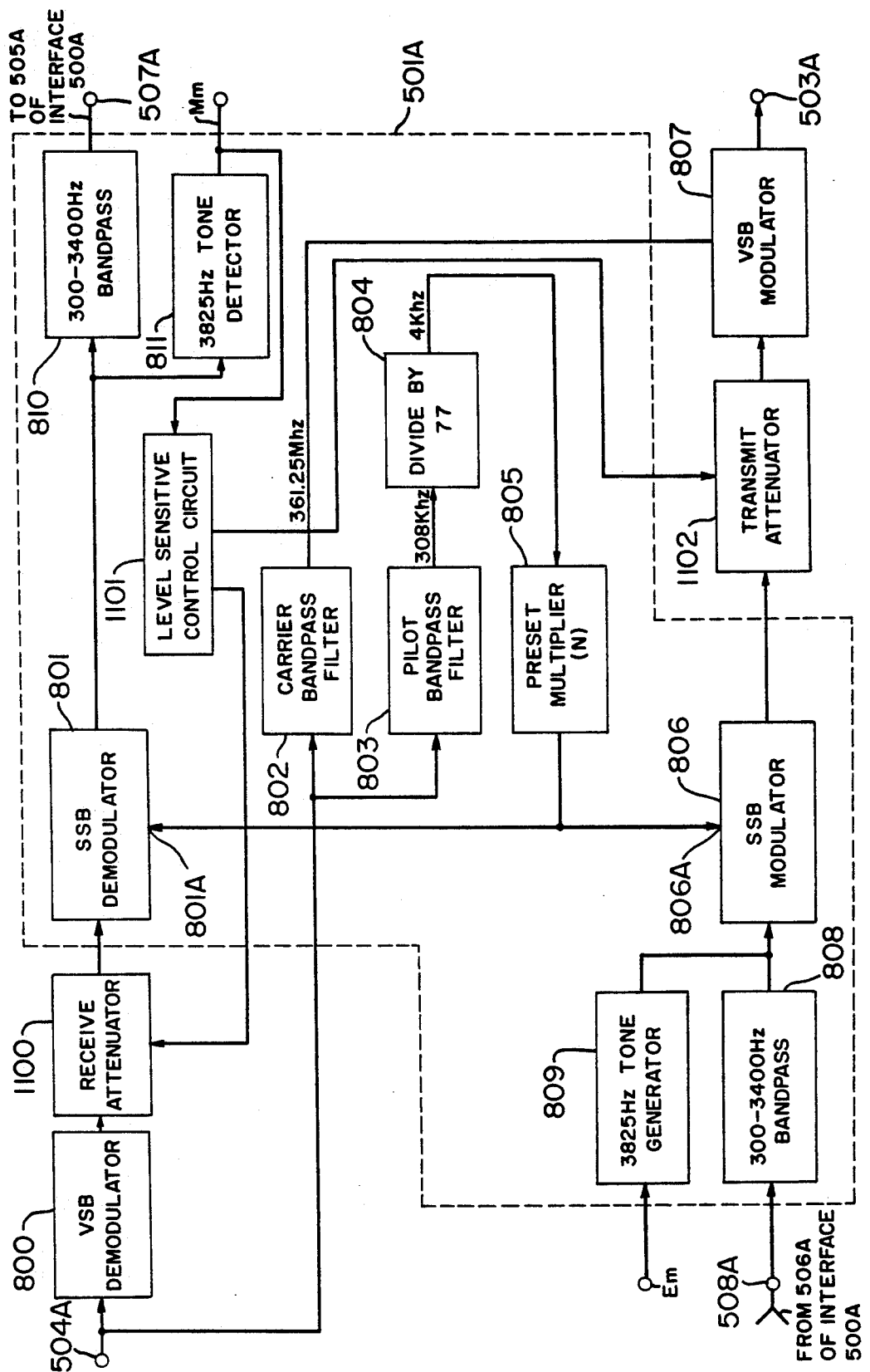
FIG. 12 shows the subscriber end of the system of FIGS. 1A and 1B and, in particular, the modulation/demodulation apparatus used at this end and shown in FIG. 7, modified to provide signal level adjustment in accordance with the principles of the present invention.

The power adjust circuits at the subscriber end of the system 1 have been incorporated into certain components of the drop boxes serving the subscriber locations. FIG. 12 shows the components of the drop box 5A serving the subscriber location 7A and, in particular, the VSB modem 502A and the single channel multiplexer 501A depicted in FIG. 7, modified in this manner. The other drop boxes of the system are similarly modified.

As shown, a power adjust circuit in the form of a receive attenuator 1100 is interposed between the VSB demodulator 800 and the SSB demodulator 801 of the single channel multiplexer 501A. The receive attenuator 1100 is responsive to control signals from a level sensitive control circuit 1101. These signals control the magnitude of the attenuation of the attenuator and, therefore, enable adjustment of the power level in the RF receive voice channel.

A transmit attenuator 1102 is further interposed between the SSB modulator 806 of the multiplexer 501A and the VSB modulator 807. The return transmit attenuator 1102 is also responsive to control signals from the level sensitive control circuit 1101. In this case, the signals likewise control the attenuation of the attenuator, thereby enabling adjustment of the power level in the transmit voice channel.

The level sensitive control circuit 1101 is responsive to the output signal of the 3825 Hz tone detector 811. As described previously, the 3825 Hz tones are used to convey various signalling information in the transmit and receive voice channels. In accordance with the present modification, these tones are also used to convey power adjust information to the control circuit 1101 for controlling the receive and transmit attenuators 1100 and 1102.

More particularly, in the present illustrative case, the TSCC 1201 first adjusts at the switch end the power levels of the particular transmit and receive channels serving an idle subscriber location, whenever there is a change in status (i.e., idle to active or active to idle) of any RF voice channel of another subscriber location served by the same RF broadband channel (i.e., 6 MHz cable channel). This is explained in greater detail hereinbelow and is accomplished by the TSCC 1201 causing adjustment of the appropriate channel power adjust circuit or circuits (e.g., the power adjust circuits 1200A to 1200N in assembly 4A).

The level sensitive control circuit 1101 at each idle subscriber location whose RF receive channel has been so adjusted at the switch end then receives the 3825 Hz tone normally being sent to indicate the idle status or on-hook condition of the location. This tone now carries the power adjustment information via having its power level changed by the respective power adjust circuit at the switch end. The circuit 1101 extracts this information, and forms therefrom appropriate control signals for the receive attenuator 1100 and the transmit attenuator 1102. The power levels of the RF transmit and receive channels at this end of the system are thus adjusted accordingly.

Figure 13:
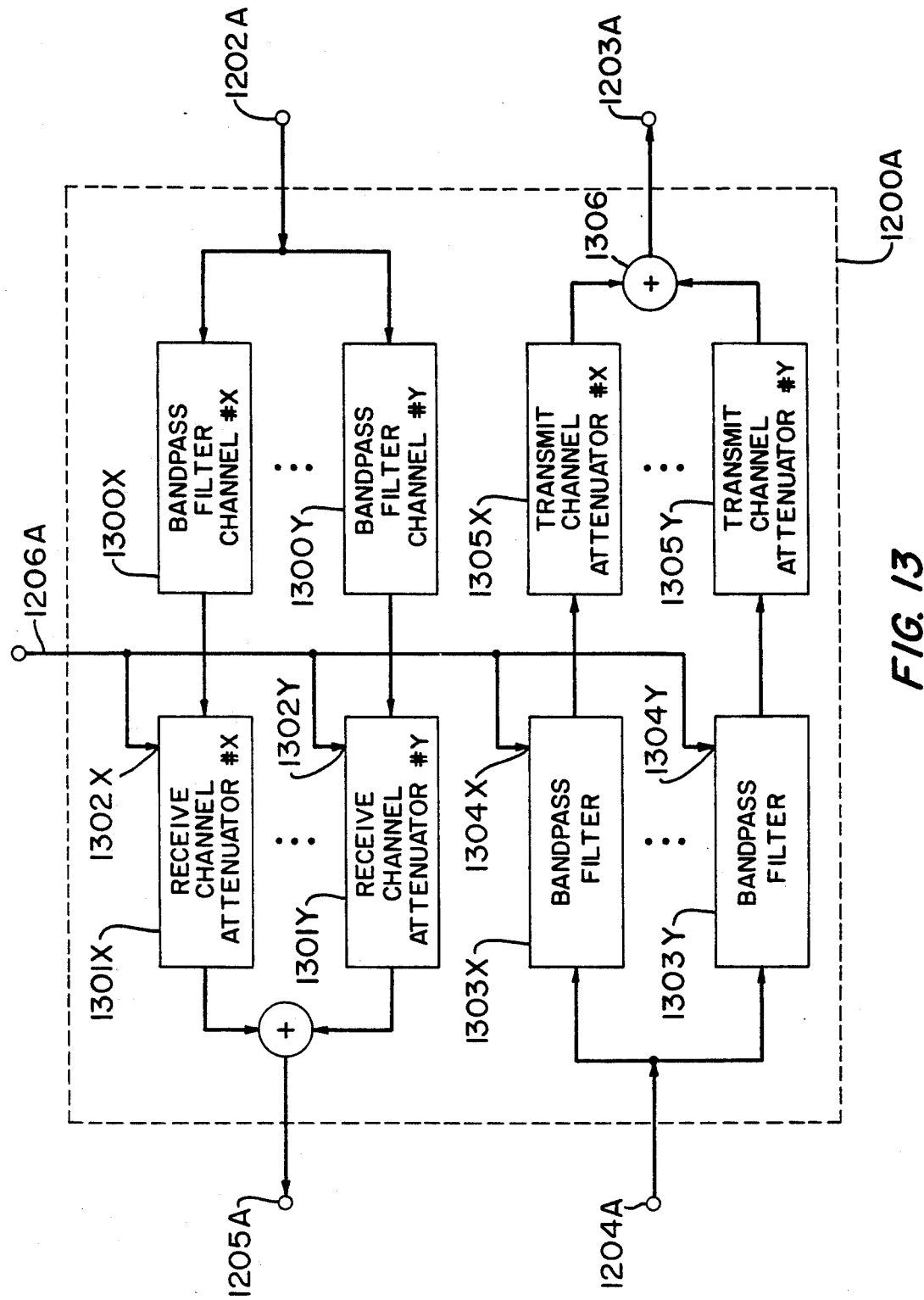
FIG. 13 shows the signal adjusting circuits shown in FIG. 11 in greater detail.

As shown in FIG. 11, each power adjust circuit at the switch end of the system 1 is interposed between a TRANSMUX and the DEMUX/MUX of the respective converter assembly 4. FIG. 13 shows the details of one power adjust circuit, i.e. the circuit 1200A of the assembly 4A. The other power adjust circuits in this assembly and the other assemblies 4B-4M are of similar configuration.

As shown, the port 1202A of the power adjust circuit receives the RF channel sub-group signal (see, FIG. 3) developed by the TRANSMUX 401A. This signal is then coupled from the port 1202A to a bandpass filter bank 1300X-1300Y which separates each of the RF receive channels in the sub-group signal. The separated channels are then passed through respective receive channel attenuators 1301X-1301Y each of whose attenuation is individually controlled in accordance with a control signal from the TSCC 1201.

These control signals are fed by the TSCC 1201 to a control terminal 1206A of the adjust circuit 1101 and from there to the appropriate attenuator control inputs 1302X-1302Y. The outputs of the receive channel attenuators 1301X-1301Y are summed by a summing circuit 1302 and provided to output port 1205A of the adjust circuit. This port connects to the input port 402A of the the DEMUX/MUX 400A. In this way, the power of each receive channel coupled from the TRANSMUX 401A to the DEMUX/MPUX 400A is controlled on the basis of the signals output from the TSCC 1201.

In the upstream direction, each transmit channel in the channel sub-group signal from the DEMUX/MUX is similarly processed. Thus, the sub-group signal from the DEMUX/MUX port 403A is coupled via port 1204A of the adjust circuit 1200A to the bandpass filter bank 1303X-1303Y. This filter bank separates the individual transmit channels and provides them to respective attenuators 1305X-1305Y.

The attenuations of these attenuators are similarly individually controlled by control signals from the TSCC 1201. These control signals are supplied to a terminal 1206A of the circuit 1200A and coupled from there to the respective attenuator control inputs 1304X-1304Y. The outputs of the transmit attenuators are summed in a summing circuit 1306 and the summed signal passed to an output port 1203A which feeds the TRANSMUX 401A. Thus, as in the receive channels, the power in the transmit channels is individually controlled at the switch end of the system 1 by the TSCC 1201.

In general, for each given RF receive voice channel, the adjustments in attenuation made to the power adjust circuits at the switch and subscriber ends (e.g., made to attenuators 1301X-Y and attenuators 1100, respectively,) will be inverse to each other. In other words, as the power in the receive channel is increased at one end by decreasing the attenuation of the respective attenuator (e.g., one of the attenuators 1301X-Y), the power in the receive channel is appropriately decreased at the other end by increasing the attenuation of the respective attenuator at that end (e.g., the appropriate attenuator 1100). Similarly, the attenuators 1305X-1305Y and the attenuators 1102 at opposite ends of each transmit channel are also likewise inversely changed. In the case of both types of channels, transmit and receive the total attenuation provided by the attenuators at both ends should be such as to equal 1/N, where N is the total number of channels on the respective RF broadband channel.

As above-indicated, the TSCC 1201 develops its control signals for adjusting the power level in the transmit and receive RF voice channels carried on a particular RF broadband channel based on the traffic condition of these voice channels on the TDM switch 302. In order to accomplish this, the switch 302 transmits to the TSCC 1201 information regarding a change in the status (i.e., active to idle or idle to active) of the RF voice channels on each RF broadband channel.

For example, referring to FIG. 8, which shows the sequence of events when placing a call using channels B and A, at STEP 3 when the TDM switch 302 senses PHONE B OFF-HOOK over transmit channel B, the switch 3 sends data to the TSCC 1201 indicating that the channel B has become active. At STEP 17, when the switch senses PHONE B ON-HOOK, the switch 3 sends data to the TSCC 1201 indicating that channel B has become idle or inactive. Similarly, at STEP 6, when the switch 3 sends RING INSTRUCTION over receive channel A, the switch sends data to the TSCC 1201 indicating that channel A is now active. At STEP 22, when the switch 3 senses PHONE A ON-HOOK on transmit channel A, the switch 3 sends data to the TSCC 1201 indicating that channel A is now idle.

The TSCC 1201 can process in a variety of ways the information regarding the status of the RF voice channels of an RF broadband channel to develop the traffic condition of the switch 302 with respect thereto and, based thereon, the control signals for respective power level adjustments. A number of typical ways will be described below in which the processing is updated after each change in channel status to develop power level adjustment signals for the channels which remain idle. The next channel to become active will then operate based on the current adjustment level, while further power level adjustments signals will again be developed for the remaining idle channels due to this next channel becoming active.

In this illustrative procedure, channels which are already active are not further adjusted during their active state to avoid possible disturbances of calls in progress. Only when these channels become idle again will they be further adjusted based on changes in status of their associated channels.

For developing the power adjust signals, the TSCC 1201 will generally use the channel status information and other information pertaining to the RF voice channels in each RF broadband channel to create and maintain the following items of status data in a memory (not shown) for each broadband channel:

Data For Each RF Broadband Channel

J = The total number of voice channel seizures
Na = The current number of active voice channels
A table of the active voice channels
A table of the idle voice channels The above data is initialized by assigning a zero or null value to the variables at a time when there are no calls in progress on the respective voice channels (i.e., upon initialization of the system).

For each broadband RF channel, the TSCC 1201 then uses the associated status data to determine the power level adjust value Px to be assigned to the idle channels in that broadband channel and which will applied to the next channel to become active. Px will generally be a function of one or more of the following parameters: Na, Pmax and Pa, where Pmax is the maximum power assigned to the particular RF broadband channel and Pa is the total power currently assigned to all the active channels on this broadband channel. A typical value of Pmax might be the above-discussed IEEE Standard 802.7 of +54 dBmV.

When the TSCC 1201 detects that an idle voice channel in a broadband RF channel is becoming active it is added to the corresponding list of active voice channels for the broadband channel, and the current value of Px for the broadband channel is associated with that voice channel in the list. When a voice channel is added or removed from its corresponding list of active channels, the TSCC 1201 generates new values for Pa and Px for the associated broadband channel. The functional relationship between the value of Px of a particular broadband RF channel and the variables upon which it depends may be determined empirically from the actual traffic on the switch 302 of the voice channels in the broadband channel or it may be based on a theory of statistical fluctuations determined for telephone traffic.

An example of a statistical model for telephone traffic is one based upon the Poisson distribution. In this model, it is assumed that each call is of a duration T and arrives independently at a mean calling rate R which is substantially constant over periods considerably greater than T. The quantity RT is a measure of the telephone "traffic". When R and T are measured with reference to the same unit of time, the unit of traffic is often named "Erlang" (although in the present case RT is actually dimensionless).

With this model, the probability that there are exactly k calls in progress is:

$$\frac{e^{-RT}(RT)^k}{k!},$$

The probability that there are k or more calls in progress is:

$$\sum_{i=k}^{\infty} \frac{e^{-RT}(RT)^k}{k!}.$$

The above probabilities are based on the probability integral of the chi-squared distribution, $Q(X^2|v)$, where $k = \frac{1}{2}v$, and $RT = \frac{1}{2}X^2$. This is discussed, for example, in the handbook of Mathematical Functions, National Bureau of Standards Applied Mathematics Series 55, (Washington D.C., 1964), Sections 26.4.2 and 26.4.21. The handbook sets forth values of this function and its percentage points in Tables 26.7 and 26.8. When applied to telephone traffic, this quantity is fairly accurate model for the blocking probability for a trunk group of k members. A suitable approximation for the inverse function, i.e., the traffic function RT, for large k and small probability, is:
Ti $RT = \frac{1}{4}(x + \sqrt{4k - 1})^2$,
which may be further approximated as:

$$RT = k + x\sqrt{k} + \frac{x^2 - 1}{4}.$$

Here, x depends on the probability, as follows:

| Probability | x |
| --- | --- |
| $10^{-3}$ | −3.09023 |
| $10^{-4}$ | −3.71902 |
| $10^{-5}$ | −4.26489 |
| $10^{-6}$ | −4.75342 |

It should be noted that different functional relationships among $N_a$, $P_{max}$, and $P_a$ might be suitable for use in determining $P_x$ for a given broadband channel in different situations. Factors that might influence the choice of a functional relationship include the time of day, the day of the week, the proportions of business and residential traffic, and the proportions of calls that are between a subscriber location served by the cable network and a subscriber location not served by the network (involving one voice channel per call) and calls between subscriber locations both served by the cable network (involving two voice channels per call). The suitability of any particular function may be judged by the degree to which the resulting values of $P_x$ exceed $P_{max}/N$, where N is the total number of idle and active channels for the particular broadband RF channel.

Figure 14:
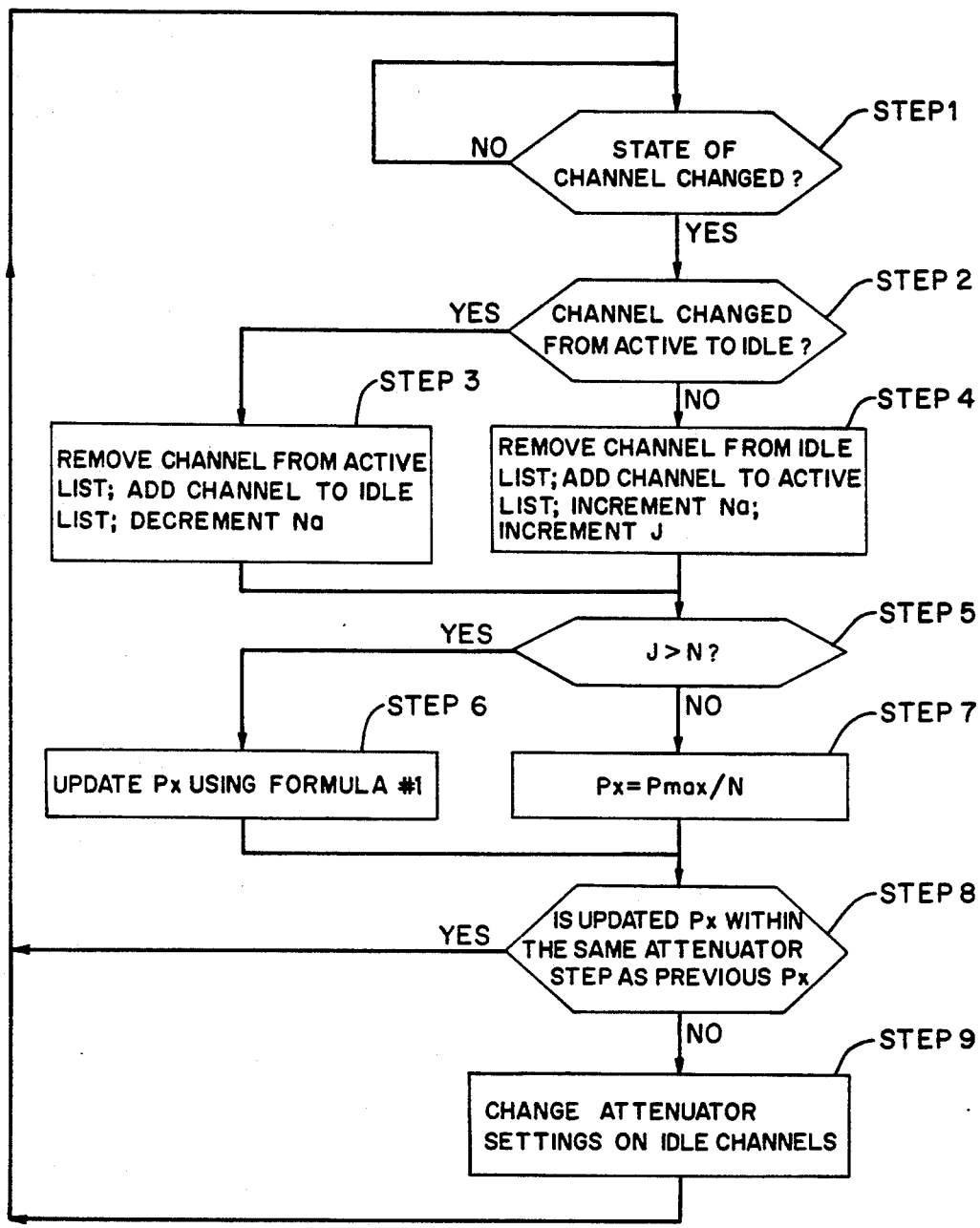
FIGS. 14 and 15 show flow diagrams for effecting signal level adjustment in accordance with two different illustrative level adjustment formulations.

FIG. 14 is a flow chart showing processing by the TSCC 1201 using a functional relationship as a formula for $P_x$, which makes use of the parameter $N_a$ only. For the first n channels of a given broadband channel becoming active (i.e., channel seizures), $P_x$ is assigned the value $P_{max}/N$. A typical value for n is 100. Starting with seizure number n+1, $P_x$ is computed by the formula:

$$P_x = \frac{P_{max}}{F(N_a)} \quad \text{(Formula 1)}$$

In the above Formula 1 the value F is a function of $N_a$ and is designed to make the probability that future values of $N_a$ would exceed F very low, e.g. $10^{-3}$. For values of traffic for the given broadband channel that are comparable to or greater than one Erlang, $N_a$ will have an average value of RT if each call involves one voice channel or 2RT if each call involves two voice channels. If the traffic for the broadband channel is so low that there is never more than one call in progress, $N_a$ alternates between 0 and 1 if each call involves just one voice channel, while if each call involves two voice channels, $N_a$ is between 0, 1 or 2.

Consider the case in which two voice channels are used for each call. Then values of F are calculated using $N_a = 2RT$ and F = 2k as the arguments of the probability function. Even if traffic for the broadband channel is as high as 0.428 Erlangs, the probability that there will be more than four calls in progress is 0.001. Thus, 8 channels is an appropriately conservative value of F when $N_a$ is a 0 or 1. When $N_a$ is 773, F equals 900, so for higher values F is independent of $N_a$. The following table gives representative values of F derived on this basis:

| $N_a$ | F |
| --- | --- |
| 0 | 8 |
| 1 | 8 |
| 2 | 12 |
| 3 | 14 |
| 4 | 16 |
| 10 | 28 |
| 20 | 44 |
| 40 | 72 |
| 80 | 124 |
| 160 | 220 |
| 320 | 400 |
| 498 | 600 |
| 605 | 712 |
| 774 | 900 |
| 899 | 900 |

FIG. 14 shows a flowchart of the operation of TSCC 1201 using Formula 1 to determine $P_x$ for each given broadband RF channel. Referring to the flowchart, at STEP 1 —STATE OF CHANNEL CHANGED?, a check is made to determine whether any of the voice channels in the broadband channel have changed state. The program continues to loop at STEP 1 until a change of state occurs at which time progress in made to STEP 2.

STEP 2—CHANNEL CHANGED FROM ACTIVE TO IDLE?—, if the channel has been changed from an active state to an idle state progress is made to STEP 3—REMOVE CHANNEL FROM ACTIVE LIST; ADD CHANNEL TO IDLE LIST; DECREMENT $N_a$—. If the channel has not been changed from an active state to an idle state, it is assumed that the channel has changed from the idle state to the active state and progress is made to STEP 4—REMOVE CHANNEL FROM IDLE LIST; ADD CHANNEL TO ACTIVE LIST; INCREMENT $N_a$—.

At STEP 5—J>n—, if J >n progress is made to STEP 6—UPDATE $P_x$ USING FORMULA 1—, where the value for the particular broadband channel of $P_x$ is updated in accordance with Formula 1. If J is not >n, progress is made to STEP 7—$P_x = P_{max}/N$—, where the value of $P_x$ is updated in accordance with the formula $P_x = P_{max}/N$.

At STEP 8 —IS UPDATED $P_x$ WITHIN THE SAME ATTENUATOR STEP AS PREVIOUS $P_x$?—, the attenuators, e.g., 1301X–1301Y, 1305X–1305Y, 1100 and 1102, are assumed to be adjustable in discrete steps. If the updated $P_x$ is within the same attenuator step as the previous value of $P_x$, the attenuator settings are maintained and progress is made to STEP 1. However, if the updated $P_x$ is not within the same attenuator step as the previous $P_x$, progress is made to STEP 9—CHANGE ATTENUATOR SETTINGS on IDLE CHANNELS—, where the attenuator settings are changed for each idle channel in the RF broadband channel. After STEP 9 progress is made to STEP 1.

Figure 15:
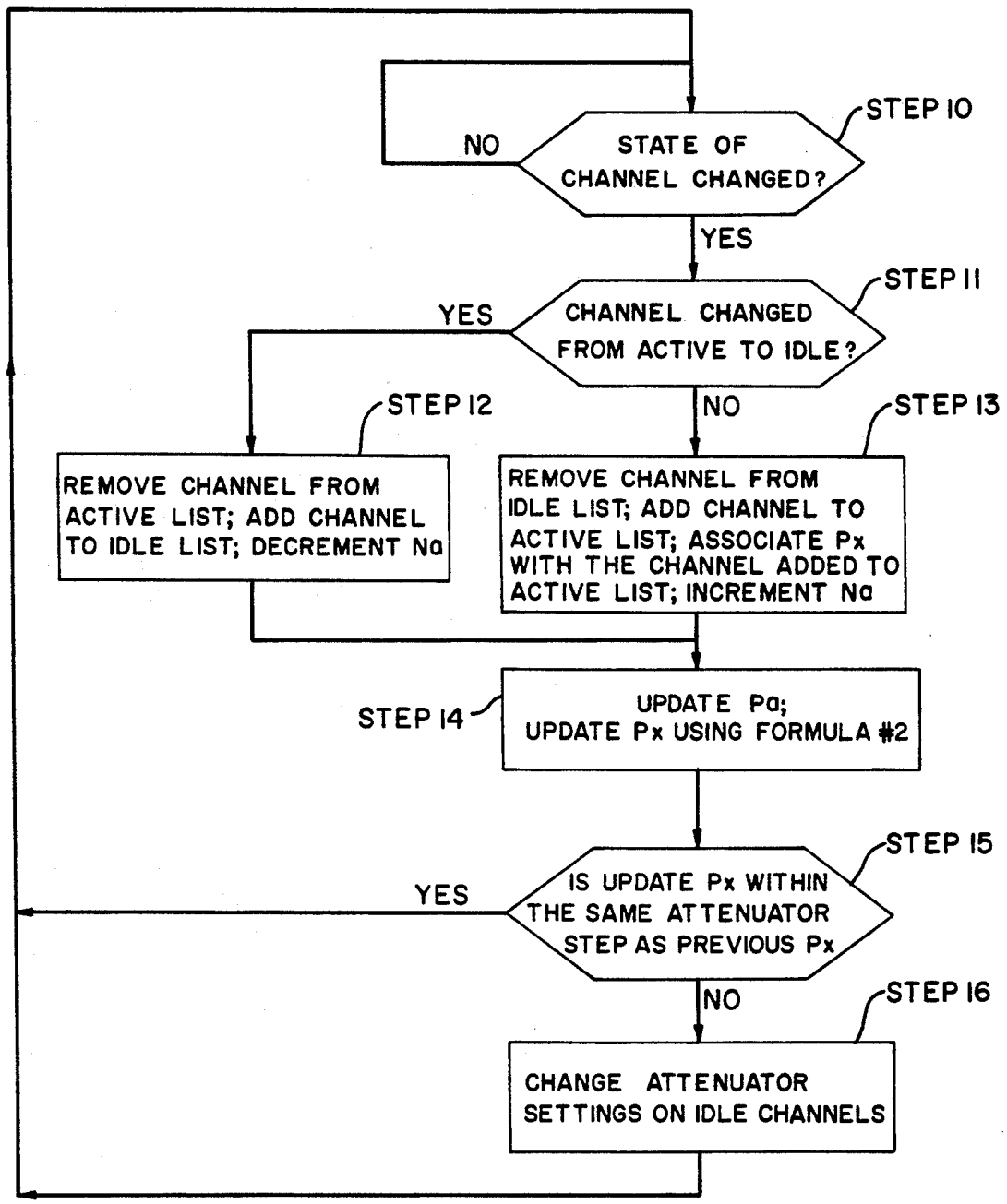

Formula 1 is most suitable for periods when the average calling rate is relatively constant. FIG. 15 is a flowchart showing processing using a formula which is based on the power available for allocation ($P_{max} - P_a$) on a broadband RF channel. This may be appropriate when the calling rate is changing too rapidly to be modelled well by a fixed value of R. Processing by this method is the same for all values of j:

$$P_x = \frac{P_{max} - P_a}{G(N_a)} \quad \text{(Formula 2)}$$

Similar to F in formula 1, G is a function of $N_a$ and is a numerical quantity which is related to the statistical properties of telephone traffic. For low traffic, G approaches F. When there are only a few idle channels, G equals $(N-N_a)$, so that, for example, when there is just one idle channel, $G=1$. When there are no idle channels, G is not defined. For intermediate values of $N_a$, G is equal to the difference between the value of $N_a$ expected at probability 0.001 and the current value. There is the possibility that this processing might occasionally produce values of $P_x$ that are less than $P_{max}/N$. The maximum value of G is 126, at $N_a=774$. The following table gives representative values of G as a function of $N_a$.

| $N_a$ | G |
|---|---|
| 0 | 8 |
| 1 | 8 |
| 2 | 10 |
| 3 | 11 |
| 4 | 12 |
| 10 | 18 |
| 20 | 24 |
| 40 | 32 |
| 80 | 44 |
| 160 | 60 |
| 320 | 80 |
| 498 | 102 |
| 605 | 107 |
| 705 | 117 |
| 774 | 126 |
| 800 | 100 |
| 890 | 10 |
| 898 | 2 |
| 899 | 1 |

Referring to the flowchart of FIG. 15, at STEP 10—STATE OF CHANNEL CHANGED?—, a check is made to determine whether any of the voice channels in a given RF broadband channel have changed state. The program continues to loop at STEP 1 until a change of state occurs at which time progress in made to STEP 11.

STEP 11—CHANNEL CHANGED FROM ACTIVE TO IDLE?—, if the channel has been changed from an active state to an idle state progress is made to STEP 12—REMOVE CHANNEL FROM ACTIVE LIST; ADD CHANNEL TO IDLE LIST; DECREMENT $N_a$—. If the channel has not been changed from an active state to an idle state, it is assumed that the channel has changed from an idle state to an active state and progress is made to STEP 13—REMOVE CHANNEL FROM IDLE LIST; ADD CHANNEL TO ACTIVE LIST; ASSOCIATE $P_x$ WITH CHANNEL ADDED TO ACTIVE LIST; INCREMENT $N_a$—.

At STEP 14—UPDATE $P_a$; UPDATE $P_x$ USING FORMULA 2—, $P_a$ is updated and the value of $P_x$ for the particular broadband channel is updated in accordance with Formula 2.

At STEP 15—IS UPDATED $P_x$ WITHIN THE SAME ATTENUATOR STEP AS PREVIOUS $P_x$?—, the attenuators, e.g., 1301X-1301Y, 1305X-1305Y, 1100 and 1102, are again assumed to be adjustable in discrete steps. If the updated $P_x$ is within the same attenuator step as the previous value of $P_x$, the attenuator settings are maintained and progress is made to STEP 10. However, if the updated $P_x$ is not within the same attenuator step as the previous $P_x$, progress is made to STEP 16—CHANGE ATTENUATOR SETTINGS ON IDLE CHANNELS—, where the attenuator settings are changed for each idle channel in the RF broadband channel. After STEP 16, progress is made to STEP 10.

Both Formula 1 and Formula 2 can be modified slightly to account for the fact that the amount of power available for the active channels in a given broadband RF channel is not quite as large as $P_{max}$, because of the low-level signalling tone on each idle channel.

It should be noted that in the description above of the adjust circuits at the switch end of the system 1, it was assumed that the output power from the TRANSMUXES associated with a given broadband RF channel exceeded $P_{max}$, for that channel, so that the adjust circuits could be fabricated from attenuators. However, if this is not the case, the adjust circuits might require the use of variable gain amplifiers to provide the desired signal level adjustment. Likewise the adjust circuits at the subscriber end may require variable gain amplifiers for like reasons relative to the output power of the signal generating equipment.

In the above description of the present invention, the TSCC 1201 was described in terms of adjusting the power levels of the RF voice channels in each given RF broadband channel separately from the voice channels in each of the other RF broadband channels. However, the invention is intended to cover power level adjustments for the voice channels in the different RF broadband channels which are made in some combined or interrelational manner between and among the different RF broadband channels.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:
1. A system comprising:
 a plurality of telephone subscriber locations, each telephone subscriber location including means for establishing an RF transmitting channel and an RF receiving channel associated with the subscriber location for conveying signalling and voice information from and to, respectively, the subscriber location;
 a broadband cable network for carrying the RF receiving and transmitting channels of said subscriber locations;
 central switch means responsive to said cable network for enabling each RF transmitting channel on the cable network to be selectively coupled to any of the RF receiving channels on the cable network, whereby communication between the subscriber locations of the coupled channels is enabled; and
 adjusting means responsive to said central switching means for enabling selective adjustment only of each idle RF transmitting channel and each idle RF receiving channel, whereby each adjusted idle RF receiving channel and each adjusted idle RF receiving channel when active has the level of the signalling and voice information adjusted thereon.

2. A system in accordance with claim 1 wherein:
 said selective adjustment is such that the power level of said signalling and voice information is adjusted.

3. A system in accordance with claim 2 wherein:
 said adjusting means is responsive to the traffic condition of said central switch means in enabling said selective adjustment.

4. A system in accordance with claim 3 wherein:

for each channel said selective adjustment is at the central switch means end and the subscriber location end of said system.

5. A system in accordance with claim 4 wherein:
for each channel, said selective adjustment on the central switch means end of said system is inverse to said selective adjustment on the subscriber location end of said system.

6. A system in accordance with claim 5 wherein:
said adjusting means includes for each channel a first signal adjust means in that channel at the subscriber location associated with that channel and a second signal adjust means in that channel at the central switch means;
and said adjusting means further includes first control means responsive to the traffic condition on said central switch means for developing signals for enabling control adjustment of at least said second signal adjust means in each channel only when that channel is idle.

7. A system in accordance with claim 6 wherein:
said adjusting means includes at each subscriber location second control means responsive to the signalling information on the RF receiving channel associated with that subscriber location for enabling control adjustment of the first signal adjust means in said associated RF receiving channel only when that associated RF receiving channel is idle, and for enabling control adjustment of the first signal adjust means in the RF transmitting channel associated with that subscriber location only when that associated RF transmitting channel is idle.

8. A system in accordance with claim 7 wherein:
said central switch means provides signalling information in the receiving channel associated with the subscriber location having a channel whose second signal adjust means has been adjusted.

9. A system in accordance with claim 7 wherein:
said first control means also develops signals for enabling control adjustment of the first signal adjust means in each channel only when that channel is idle;
and said central switch means is responsive to said signals for enabling control adjustment of said first signal adjust means generated by said first control means and provides signalling information in the receiving channel associated with each subscriber location having a channel whose second signal adjust means is to be adjusted.

10. A system in accordance with claim 6 wherein:
each of said first and second adjust means includes an adjustable attenuator.

11. A system in accordance with claim 3 wherein:
said traffic condition is related to the number of channels which are active.

12. A system in accordance with claim 11 wherein:
each time a channel changes from active to idle or from idle to active, said selective adjustment occurs.

13. A system in accordance with claim 3 wherein:
said broadband cable network includes one or more broadband RF channels each of which carries a number of said RF transmitting and receiving channels;
and said adjusting means enables said selective adjustment responsive to the traffic condition of said switch means in respect of the RF transmitting and receiving channels carried by only the RF broadband channel which carries the particular RF transmitting or receiving channel being adjusted.

14. A system in accordance with claim 3 wherein:
said broadband cable network includes one or more broadband RF channels each of which carries a number of said RF transmitting and receiving channels;
and said adjusting means enables said selective adjustment responsive to the traffic condition of said switch means in respect of the RF transmitting and receiving channels carried by the RF broadband channel which carries the particular RF transmitting or receiving channel being adjusted and by one or other RF broadband channels.

15. A method comprising:
for each of a plurality of telephone subscriber locations, establishing an RF transmitting channel and an RF receiving channel associated with the subscriber location for conveying signalling and voice information from and to, respectively, the subscriber location;
carrying the RF receiving and transmitting channels of said subscriber locations on a broadband cable network;
using a central switch means to enable each RF transmitting channel on the cable network to be selectively coupled to any of the RF receiving channels on the cable network, whereby communication between the subscriber locations of the coupled channels is enabled; and
responsive to said central switching means, enabling selective adjustment only of each idle RF transmitting channel and each RF receiving channel, whereby each adjusted idle RF transmitting and each adjusted idle RF receiving channel when active has the level of the signalling and voice information adjusted thereon.

16. A method in accordance with claim 15 wherein:
said selective adjustment is such that the power level of said signalling and voice information is adjusted.

17. A method in accordance with claim 16 wherein:
said enabling is in response to the traffic condition of said central switch means.

18. A method in accordance with claim 17 wherein:
for each channel said selective adjustment is at the central switch means and the subscriber location.

19. A method in accordance with claim 18 wherein;
for each channel, said selective adjustment at the central switch means is inverse to said selective adjustment at the subscriber location.

20. A method in accordance with claim 19 wherein:
for each channel said selective adjustment is of a first signal adjust means in that channel at the subscriber location associated with that channel and is of a second signal adjust means in that channel at the central switch means;
and said enabling further includes responsive to the traffic condition on said central switch means, developing signals for enabling control adjustment of at least said second signal adjust means in each channel only when that channel is idle.

21. A method in accordance with claim 20 wherein:
said enabling includes at each subscriber location responsive to the signalling information on the receiving RF channel associated with that subscriber location controlling adjustment of the first signal adjust means in said associated RF receiving channel only when said RF receiving channel is idle, and controlling adjustment of the first signal adjust means in the RF transmitting channel associated with that subscriber location only when said RF transmitting channel is idle.

22. A method in accordance with claim 21 wherein: said enabling includes: said central switch means providing signalling information in the receiving channel associated with the subscriber location having a channel whose second signal adjust means has been adjusted.

23. A method in accordance with claim 21 wherein: said enabling includes: responsive to said traffic condition on said central switch means, developing signals for enabling control adjustment of said first signal adjust means in each channel only when that channel is idle; and responsive to said signals for enabling control adjustment of said first signal adjust means, providing signalling information in the receiving channel associated with the subscriber location having a channel whose first signal adjust means is to be adjusted.

24. A method in accordance with claim 20 wherein: each of said first and second adjust means includes an adjustable attenuator.

25. A method in accordance with claim 17 wherein: said traffic condition is related to the number of channels which are active.

26. A method in accordance with claim 17 wherein: each time a channel changes from active to idle or from idle to active, said selective adjustment occurs.

27. A method in accordance with claim 17 wherein: said broadband cable network carries said RF transmitting and receiving channels in one or more broadband RF channels;
and said enabling enables said selective adjustment responsive to the traffic condition of said switch means in respect of the RF transmitting and receiving channels carried by only the RF broadband channel which carries the particular RF transmitting or receiving channel to be adjusted.

28. A method in accordance with claim 17 wherein: said broadband cable network carries said RF transmitting and receiving channels in one or more broadband RF channels;
and said enabling enables said selective adjustment responsive to the traffic condition of said switch means in respect of the RF transmitting and receiving channels carried by the RF broadband channel which carries the particular RF transmitting or receiving channel to be adjusted and by one or more RF broadband channels.

29. Apparatus for use with a telephone subscriber location, the telephone subscriber location being used with other telephone subscriber locations and with a broadband cable network for carrying RF transmitting and receiving channels associated with the subscriber locations, with a central switch means responsive to the cable network for enabling each RF transmitting channel on the cable network to be selectively coupled to any of the RF receiving channels on the cable network and with adjusting means for enabling selective adjustment of each idle RF transmitting channel and each idle RF receiving channel, whereby each adjusted idle RF transmitting channel and each adjusted idle RF receiving channel when active has the level of the signalling and voice information adjusted thereon, the apparatus comprising:

means for establishing an RF transmitting channel and an RF receiving channel associated with said subscriber location for conveying signalling and voice information from and to, respectively, the subscriber location;
means adapted for use in coupling said apparatus with said cable network;
and means responsive to the signalling information in said established RF receiving channel for adjusting said established RF transmitting and RF receiving channels only when said established RF transmitting and RF receiving channels are idle, whereby said adjusted idle RF transmitting and RF receiving channels when active have the level of signalling and voice information adjusted thereon.

30. Apparatus in accordance with claim 29 wherein: said responsive means includes: first attenuation means in said established RF receiving channel; further first attenuation means in said established RF transmitting channel; and control means responsive to said signalling information for adjusting the attenuation of said first and further first attenuation means only when said established RF receiving channel and said established RF transmitting channel are idle, respectively.

31. Apparatus for use with telephone subscriber locations, each telephone subscriber location including means for establishing an RF transmitting channel and an RF receiving channel associated with the subscriber location for conveying signalling and voice information from and to, respectively, the subscriber location, and with a broadband cable network for carrying the RF receiving and transmitting channels of said subscriber locations, said apparatus comprising:
central switch means responsive to said cable network for enabling each RF transmitting channel on the cable network to be selectively coupled to any of the RF receiving channels on the cable network;
means adapted to couple said central switch means and said cable network;
and adjusting means responsive to said central switch means for enabling selective adjustment of each RF transmitting channel and each RF receiving channel, whereby each adjusted idle RF transmitting channel and each adjusted idle RF receiving channel when active has the level of the signalling and voice information adjusted thereon.

32. Apparatus in accordance with claim 31 wherein: said selective adjustment is of the power level of the signalling and voice information.

33. Apparatus in accordance with claim 32 wherein: said adjusting means is responsive to the traffic condition of said central switch means in enabling said selective adjustment.

34. Apparatus in accordance with claim 33 wherein: said adjusting means includes for each channel a first signal adjust means in that channel at the central switch means;
and said adjusting means further includes control means responsive to the traffic on said central switch means for developing signals for enabling control adjustment of at least said first signal adjust means in each channel only when that channel is idle.

35. Apparatus in accordance with claim 34 wherein: said central switch means provides signalling information in the receiving channel associated with the subscriber location having a channel whose first signal adjust means has been adjusted.

36. A system in accordance with claim 34 wherein:
said control means develops signals for enabling control adjustment of second signal adjust means in each channel at the subscriber locations only when that channel is idle;
and said central switch means is responsive to said signals for enabling control adjustment of said second signal adjust means generated by said control means and provides signalling information in the receiving channel associated with each subscriber location having a channel whose second signal adjust means is to be adjusted.

37. Apparatus in accordance with claim 36 wherein: each of said first and second signal adjust means includes an adjustable attenuator.

38. Apparatus in accordance with claim 33 wherein: said traffic condition is related to the number of channels which are active.

39. Apparatus in accordance with claim 33 wherein: each time a channel changes from active to idle or from idle to active, said selective adjustment occurs.

40. A system in accordance with claim 33 wherein: said broadband cable network includes one or more broadband RF channels each of which carries a number of said RF transmitting and receiving channels;
and said adjusting means enables said selective adjustment responsive to the traffic condition of said switch means in respect of the RF transmitting and receiving channels carried by only the RF broadband channel which carries the particular RF transmitting or receiving channel being adjusted.

41. A system in accordance with claim 33 wherein: said broadband cable network includes one or more broadband RF channels each of which carries a number of said RF transmitting and receiving channels;
and said adjusting means enables said selective adjustment responsive to the traffic condition of said switch means in respect of the RF transmitting and receiving channels carried by the RF broadband channel which carries the particular RF transmitting or receiving channel being adjusted and by one or other RF broadband channels.

42. A method for use with a telephone subscriber location, the telephone subscriber location being used with other telephone subscriber locations and with a broadband cable network for carrying RF transmitting and receiving channels associated with the subscriber locations, with a central switch means responsive to the cable network for enabling each RF transmitting channel on the cable network to be selectively coupled to any of the RF receiving channels on the cable network and with adjusting means for enabling selective adjustment of each idle RF transmitting channel and each idle RF receiving channel, whereby each adjusted idle RF transmitting channel and each adjusted idle RF receiving channel when active has the level of the signalling and voice information adjusted thereon, the method comprising:
establishing an RF transmitting channel and an RF receiving channel associated with said subscriber location for conveying signalling and voice information from and to, respectively, the subscriber location;
coupling said RF transmitting and receiving channels with said cable network;
and responsive to the signalling information in said established RF receiving channel, adjusting said established RF transmitting and RF receiving channels only when said established RF transmitting and RF receiving channels are idle, whereby said adjusted idle RF transmitting and RF receiving channels when active have the level of the signalling and voice information adjusted thereon.

43. A method for use with telephone subscriber locations, each telephone subscriber location including means for establishing an RF transmitting channel and an RF receiving channel associated with the subscriber location for conveying signalling and voice information from and to, respectively, the subscriber location, and with a broadband cable network for carrying the RF receiving and transmitting channels of said subscriber locations, said method comprising:
using a central switch means responsive to said cable network, permitting each RF transmitting channel on the cable network to be selectively coupled to any of the RF receiving channels on the cable network;
coupling said central switch means and said cable network;
and responsive to said central switch means, enabling selective adjustment of each idle RF transmitting channel and each idle RF receiving channel, whereby each adjusted idle RF transmitting channel and each adjusted idle RF receiving channel when active has the level of the signalling and voice information adjusted thereon.

44. A method in accordance with claim 43 wherein: said selective adjustment is of the power level of said signalling and voice information.

45. A method in accordance with claim 44 wherein: said enabling is responsive to the traffic condition of said central switch means in enabling said selective adjustment.

46. A method in accordance with claim 45 wherein: said enabling enables adjusting for each channel of a first signal adjust means in that channel at the central switch means only when that channel is idle;
and said enabling further includes responsive to the traffic condition on said central switch means, developing signals for enabling control adjustment of said first signal adjust means in each channel only when that channel is idle.

47. A method in accordance with claim 46 wherein: said enabling further includes providing signalling information in the receiving channel associated with the subscriber location having a channel whose second signal adjust means has been adjusted.

48. A method in accordance with claim 46 wherein: said enabling includes: responsive to said traffic condition on said central switch means, developing signals for enabling control adjustment of second signal adjust means in each channel at the subscriber location only when that channel is idle; and responsive to said signals for enabling control adjustment of said second signal adjust means, providing signalling information in the receiving channel associated with the subscriber location having a channel whose second signal adjust means is to be adjusted.

49. A method in accordance with claim 45 wherein:

said traffic condition is related to the number of channels which are active.

50. A method in accordance with claim 45 wherein:
each time a channel changes from active to idle or from idle to active, said selective adjustment occurs.

51. A method in accordance with claim 45 wherein:
said broadband cable network carries said RF transmitting and receiving channels in one or more broadband RF channels;

and said enabling enables said selective adjustment responsive to the traffic condition of said switch means in respect of the RF transmitting and receiving channels carried by only the RF broadband channel which carries the particular RF transmitting or receiving channel being adjusted.

52. A method in accordance with claim 45 wherein:
said broadband cable network carries said RF transmitting and receiving channels in one or more broadband RF channels;

and said enabling enables said selective adjustment responsive to the traffic condition of said switch means in respect of the RF transmitting and receiving channels carried by the RF broadband channel which carries the particular RF transmitting or receiving channel to be adjusted and by one or more other RF broadband channels.

* * * * *

UNITED STATES PATENT AND TRADEMARK OFFICE
CERTIFICATE OF CORRECTION

PATENT NO. : 5,263,021
DATED : November 16, 1993
INVENTOR(S) : William C.G. Ortel It is certified that error appears in the above-indentified patent and that said Letters Patent is hereby corrected as shown below:

Col. 13, line 44.  After "should" insert -- be --

Col. 14, line 21.  After "send" insert -- a --

Col. 14, line 60.  Change "30" to -- 302 --

Col. 16, line 29.  Delete "the" first occurrence

Col. 16, line 68.  After "receive" insert -- , --

Col. 17, line 68.  After "will" insert -- be --

Col. 18, line 56.  After "is" insert -- a --

Col. 18, line 61.  Delete "Ti"

Signed and Sealed this

Seventeenth Day of May, 1994

Attest:

BRUCE LEHMAN

Attesting Officer  Commissioner of Patents and Trademarks